US011089052B2

(12) United States Patent
Epstein et al.

(10) Patent No.: US 11,089,052 B2
(45) Date of Patent: Aug. 10, 2021

(54) SYSTEMS AND METHODS FOR DIRECT IN-BROWSER MARKUP OF ELEMENTS IN INTERNET CONTENT

(71) Applicant: OpSec Online Limited, Washington (GB)

(72) Inventors: Jeremy Lee Epstein, Williamsville, NY (US); Joshua Alan Davidson, Meridian, ID (US); Michael Dana Huntington, Cambridge, MA (US)

(73) Assignee: OpSec Online Limited, Washington (GB)

( * ) Notice: Subject to any disclaimer, the term of this patent is extended or adjusted under 35 U.S.C. 154(b) by 18 days.

(21) Appl. No.: 15/901,194

(22) Filed: Feb. 21, 2018

(65) Prior Publication Data

US 2018/0239826 A1    Aug. 23, 2018

Related U.S. Application Data

(60) Provisional application No. 62/462,110, filed on Feb. 22, 2017.

(51) Int. Cl.
| | |
|---|---|
| *H04L 29/06* | (2006.01) |
| *H04L 29/08* | (2006.01) |
| *G06F 3/0482* | (2013.01) |
| *G06F 16/951* | (2019.01) |
| *G06F 40/134* | (2020.01) |
| *G06F 40/197* | (2020.01) |
| *G06F 16/958* | (2019.01) |
| *G06F 40/143* | (2020.01) |

(Continued)

(52) U.S. Cl.
CPC ........ *H04L 63/1483* (2013.01); *G06F 3/0482* (2013.01); *G06F 16/951* (2019.01); *G06F 16/958* (2019.01); *G06F 40/134* (2020.01); *G06F 40/143* (2020.01); *G06F 40/197* (2020.01); *G06Q 50/184* (2013.01); *H04L 67/02* (2013.01); *G06K 9/00483* (2013.01); *G06Q 30/0185* (2013.01)

(58) Field of Classification Search
CPC ....... G06F 16/951; G06F 40/14; G06F 3/0482
See application file for complete search history.

(56) References Cited

U.S. PATENT DOCUMENTS

| | | | |
|---|---|---|---|
| 7,308,648 B1 * | 12/2007 | Buchthal | ............... G06F 16/986 715/234 |
| 9,038,184 B1 | 5/2015 | Mann | |

(Continued)

OTHER PUBLICATIONS

International Search Report and Written Opinion from related International Patent Application No. PCT/US2018/018921 dated Apr. 27, 2018.

(Continued)

*Primary Examiner* — Justin R. Blaufeld
(74) *Attorney, Agent, or Firm* — McCarter & English, LLP

(57) ABSTRACT

Exemplary embodiments of the present disclosure relate to systems, methods, and non-transitory computer-readable media for contemporaneous in-browser searching, viewing, tagging, comparison, and harvesting of specific elements in digital content in a networked environment via enhanced browser environment, and for refining an operation of a portal based on the contemporaneous in-browser searching, viewing, tagging, comparison and harvesting of elements in digital content.

24 Claims, 10 Drawing Sheets

(51) Int. Cl.
    *G06Q 50/18* (2012.01)
    *G06Q 30/00* (2012.01)
    *G06K 9/00* (2006.01)

(56) References Cited

U.S. PATENT DOCUMENTS

| | | |
|---|---|---|
| 10,002,117 B1 * | 6/2018 | Ain .................. G06F 40/169 |
| 10,915,232 B1 * | 2/2021 | Bowser .................. H04L 67/02 |
| 2003/0110449 A1 * | 6/2003 | Wolfe ................. G06F 17/2247 |
| | | 715/236 |
| 2008/0201320 A1 | 8/2008 | Hong et al. |
| 2008/0288476 A1 | 11/2008 | Kim et al. |
| 2011/0078766 A1 | 3/2011 | Schachter |
| 2011/0225163 A1 | 9/2011 | Lyon |
| 2012/0198324 A1 * | 8/2012 | Mahajan ............... G06F 16/958 |
| | | 715/230 |
| 2014/0282121 A1 | 9/2014 | Sun et al. |
| 2015/0120858 A1 | 4/2015 | Anderson |
| 2016/0088015 A1 | 3/2016 | Sivan et al. |
| 2017/0078310 A1 * | 3/2017 | Hunt .................. H04L 63/1416 |
| 2017/0295206 A1 * | 10/2017 | Feiertag .................... G06F 8/61 |

OTHER PUBLICATIONS

Supplementary European Search Report from related European Patent Application No. EP18758117 dated Aug. 4, 2020.

* cited by examiner

FIG. 6

SYSTEMS AND METHODS FOR DIRECT IN-BROWSER MARKUP OF ELEMENTS IN INTERNET CONTENT

RELATED APPLICATIONS

This application claims the benefit of priority to U.S. Provisional Application No. 62/462,110, entitled Systems and Methods for Direct In-Browser Markup of Elements in Internet Content," filed on Feb. 22, 2017, the content of which is incorporated by reference herein in its entirety.

BACKGROUND

An overwhelming amount of digital content is available over networked environments, such as the Internet. This digital content is spread across multiple data channels and/or sources, and more and more content is being made available daily. Entities that generate or otherwise add content to the Internet can have several versions or variations of the content on the Internet at once. Often identifying and tracking the different versions or variations of the content on the Internet, and determining whether the different versions or variations are genuine and/or in compliance can be difficult given the fluidity with which content can be added or removed from one or more Internet data channels or sources and the overwhelming amount of content on the Internet.

SUMMARY

While some systems perform bulk pre-harvesting of digital content based on one or more searches, and subsequently perform an "offline" analysis of the digital content, this approach can be inefficient and resource intensive. Additionally, while bulk pre-harvesting of digital content can be an effective method of gathering large swaths of digital content, such bulk harvesting may not find relevant digital content and/or the pre-harvested digital content may not be up-to-date (e.g., the digital content may change after the digital content is pre-harvested requiring a user to subsequently retrieve and review the content from the data source again).

Exemplary embodiments of the present disclosure advantageously address problems associated with detecting and tracking versions or variations of elements in digital content on the Internet or other networked environments. For example, exemplary systems, methods, and computer-readable media are described herein that provide for direct in-browser, searching, viewing, tagging, markup, comparison, and harvesting elements in digital content in networked environments, while potentially avoiding large bulk harvesting of content and/or filling the gaps in bulk harvested content.

Thus, while conventional approaches generally require a two-step process including separate pre-collection of elements (e.g., images, text, markup, links, and the like) from content in networked environments, with subsequent follow up (to verify current implementation) and creation of rules or harvesting algorithms, exemplary embodiments of the present disclosure can provide for identifying specific elements of the content in networked environments while the user is browsing live content. This "live", direct, in-browser detection and tracking of elements of digital content via, e.g., direct indication on a contemporaneously retrieved webpage itself, can be followed by immediate incorporation into a portal, can be used to enable "live" search and review of additional content via the portal, and/or can increase the efficiency and accuracy of content harvesting algorithms executed by the portal.

For example, exemplary embodiments can improve the precision of discovering malignant elements within content. Malignant elements within content can include, for example elements that fail to comply with current compliance rules and/or that are fraudulent, infringing, counterfeit, and the like. Benign elements within content can include, for example, elements that comply with current compliance rules and/or elements that are authorize, authentic, an/or genuine. Embodiments of the present disclosure offer a potential to reduce false positives (e.g., falsely identifying an element as being malignant) and/or reduce the amount of time required to adjust to changes in the structure of and/or elements in content in the networked environments. Element-based detection can be utilized via embodiments of an enhance browser or a browser extension or plug-in for a web browser to add large quantities of found malignant elements to a harvesting (discovery) mechanism quickly and seamlessly, and can facilitate the ability to distinguish malignant elements from false positives based on indicating a markup context.

In accordance with embodiments of the present disclosure, a method for direct, contemporaneous, in-browser markup, tagging, comparison, and harvesting of digital content in a networked environment is disclosed. The method includes executing an enhanced browser environment (e.g., an enhanced browser or a or a web browser with a browser extension loaded) on a computing resource to facilitate independent and separate selection and tagging of elements in a webpage rendered in a browser window of the enhanced browser environment. The enhanced browser environment interfaces with a portal. The method also includes receiving selection a specific element in the webpage via the enhanced browser environment, assigning a tag to the specific element, and associating the tag with the element and a Universal Resource Locator (URL) of the webpage by the portal.

In accordance with embodiments of the present disclosure, a system for direct in-browser markup, tagging, comparison, and harvesting of digital content in a networked environment is disclosed. The system includes a remote computing system having one or more servers programmed to execute a portal accessible via a network. The system also includes at least one computing device, having installed thereon, a web browser and a browser extension, wherein the browser extension is programmed to extend the functionality of the web browser. The at least one computing device is programmed to receive selection a specific element in the webpage via the browser extension, assign a tag to the specific element, and send the tag from the browser extension to the portal to associate the tag with the element and a Universal Resource Locator (URL) of the webpage.

In accordance with embodiments of the present disclosure a system for contemporaneous in-browser tagging and harvesting of digital content in a networked environment is disclosed in which a remote computing system including one or more servers programmed to execute a portal accessible via a network. At least one computing device can access the portal via the network and can cause the one or more servers to execute an enhanced browser that is programmed to facilitate independent and separate selection and tagging of elements in a webpage rendered in a browser window of the enhanced browser, the enhanced browser can interface with the portal and can be programmed to receive selection a specific element in the webpage; assign a tag to the specific element; and request the portal to associate the tag with the element and a Universal Resource Locator (URL) of the webpage.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

FIGS. 5-7 illustrate exemplary implementations of embodiments of an enhanced web browser or a browser extension in accordance with embodiments of the present disclosure.

DETAILED DESCRIPTION

Exemplary embodiments of the present disclosure relate to systems, methods, and non-transitory computer-readable media for direct, live, in-browser searching, viewing, markup, tagging, comparison, and harvesting elements in digital content in a networked environment; autonomously updating harvesting algorithms based on the in-browser markup, tagging, and/or harvesting of the elements; and/or removing, flagging, or updating versions or variations of elements in the content.

In exemplary embodiments, an enhanced web browser or a browser extension (or plug-in) that can be executed to enhance a web browser can provide a visual mechanism built into the browser and perform one or more actions on specific, selected elements of content (e.g., images, text, markup, links, and the like in content) contemporaneously retrieved from a data source and rendered in a window of the browser. The enhanced browser and the browser extension, in conjunction with a web browser, are collectively and interchangeably referred to herein as an enhanced browser environment such that reference to the enhanced browser environment refers to the enhanced browser and/or the browser extension. The enhanced browser environment can facilitate direct indication of which elements of the content are benign or malignant. This direct and precise in-browser activity can feed directly to discovery mechanisms implemented by one or more harvesting engines in communication with the enhanced browser environment.

Figure 1A:
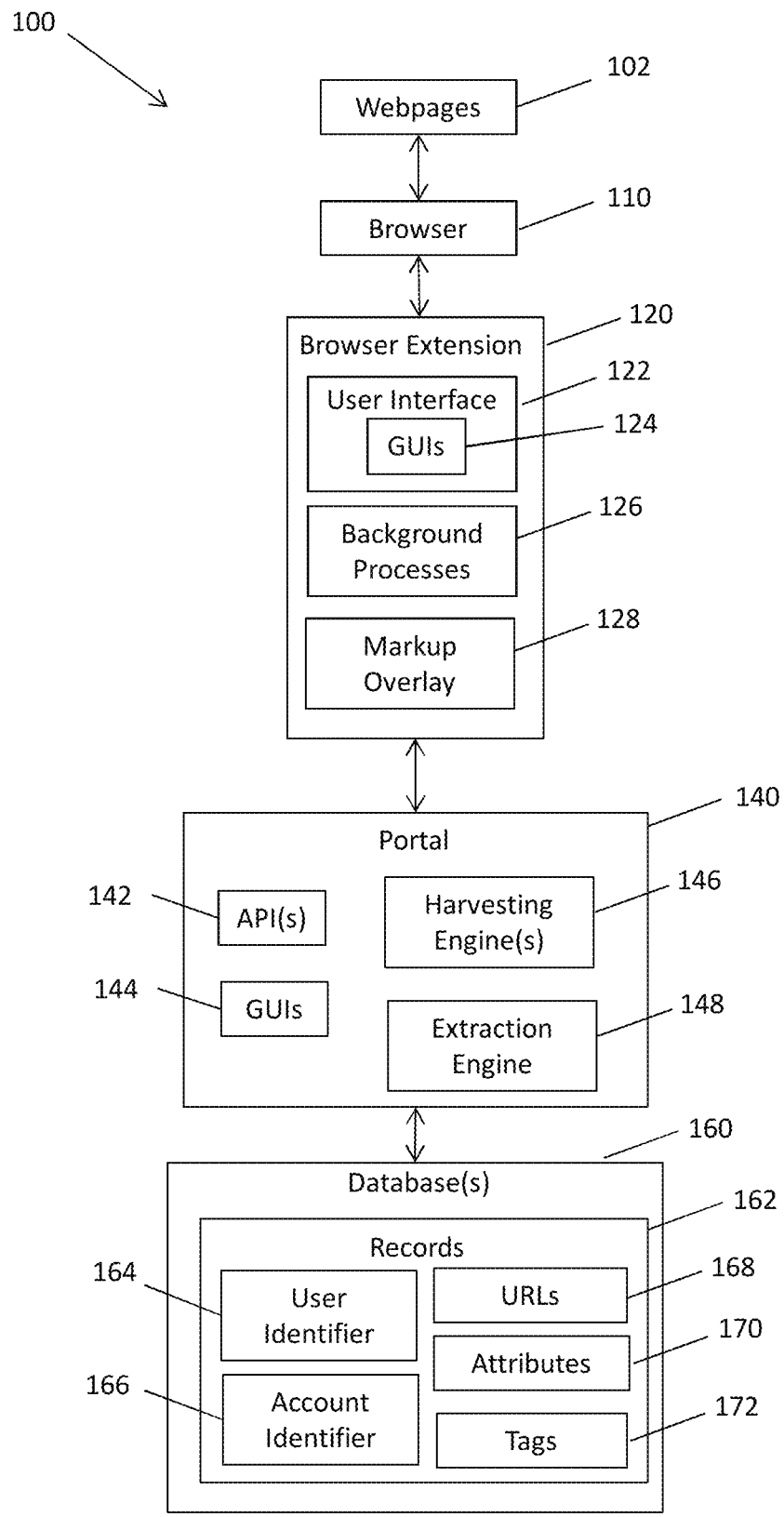
FIG. 1A is a block diagram of an exemplary environment for direct in-browser searching, viewing, markup, tagging, comparison, and harvesting of elements in digital content in a networked environment in accordance with embodiments of the present disclosure.

FIG. 1A is a block diagram of an environment 100 for contemporaneous in-browser searching, viewing, tagging, comparison, and harvesting of digital content in accordance with embodiments of the present disclosure. As shown in FIG. 1A, the environment 100 can include a web browser 110 configured to retrieve and display digital content hosted by one or more servers, e.g., based on uniform resource identifiers (URIs) or uniform resource locators (URLs) associated with the digital content. For example, the web browser 110 can query one or more webservers hosting digital content in the form of one or more webpages 102 using URIs or URLs, and can retrieve and display the one or more webpages 102 based on the URIs or URLs. The digital content can have one or more file formats, such as hypertext mark-up language files, extensible mark-up language files, portable document files (PDF), image files, audio files, video files, and/or other formats.

The web browser 110 can process the files retrieved from one or more servers to display the digital content to a user. In some instances, one or more plug-ins (e.g., Flash applications, Java applets) can be used by the web browser 110 to process files and display the digital content to the user. For example, the plug-is can allow the web browser to process webpages 102 that embed content that it would otherwise not be able to process, e.g., Flash videos, portable document formats (PDFs), or Java applets. The web browser 110 configured to open digital content in multiple browser windows or browser tabs at the same time. For example, the web browser 110 can be configured to open multiple webpages 102 at the same time, either in different browser windows or in different tabs of the same window.

In exemplary embodiments, the web browser 110 can be configured to load a browser extension or plug-in 120 that can be executed in the browser context to extend the functionality of the web browser 110. For example, the browser extension 120 can be downloaded and installed on a computing resource executing the web browser 110, and the web browser 110 can call or invoke the browser extension 120 when the computing resource launches the web browser 110 to integrate the functionality of the browser extension 120 into the web browser 110. The browser extension 120 can include one or more user interfaces 122 configured to generate one or more graphical user interfaces 124, background processes 126, and a markup overlay 128.

The browser extension 120 can extend the functionality of the web browser 110 to provide a dynamic browsing environment in which the web browser 110 and the browser extension 110 respond to the digital content being display in a browser window of the web browser 110 and/or the URL associated with the digital content being displayed. In exemplary embodiments, the dynamic behavior of the web browser 110 and the browser extension 120 can be achieved in response to an interaction between the background processes 126, the markup overlay 128 of the browser extension 120, and the browser 110, and/or between the browser extension 120 and a portal 140 accessible by the browser extension 120 via a networked environment.

To facilitate access to the portal 140, via execution of the browser extension 120, the browser extension 120 can be programmed to prompt a user for a username, account identifier, password, and/or other credentials. Once a user inputs the user credentials, the browser extension 120 can transmit the user credentials to the portal 140 for authentication, and the portal 140 can respond by granting or denying the browser extension 120 access to the portal 140. After the user credentials have been verified and the browser extension 120 has been granted access to the portal 140, the browser extension 120 can be executed in conjunction with the web browser 110 and the portal 140 to facilitate contemporaneous in-browser searching, viewing, markup, tagging, comparison, and harvesting content in a networked environment, and ultimately, to facilitate removal of malignant content from the networked environment. In some embodiments, once access to the portal 140 is granted to the browser extension 120, the portal 140 can create a session (and associated session identifier) between the portal 140 and the browser extension 120 to facilitate stateful communications between the portal 140 and the browser extension 120. In some embodiments, once access to the portal 140 is granted to the browser extension 120, the portal 140 can generate a token and transmit the token to the browser extension 120. Each time the browser extension 120 sends a message to the portal 140, the message can include the token to facilitate to access to the portal 140 with stateful and/or stateless communication.

The portal 140 can include one or more application program interfaces (APIs) 142 that are configured to interface with the browser extension 110. The API(s) 142 can process messages received from the browser extension 120 and can transmit responses to the browser extension 120. The portal 140 can include one or more databases 160 that include, for each user identifier and/or account identifier, a set of records corresponding to URLs that have been processed by the browser extension 120 and/or the portal 140 for that user identifier and/or account identifier. Each record can include fields for attribute(s) extracted from digital content corresponding to the URL associated with the records and can include fields for tags assigned to the URL associated with the record and/or for markup text or selection added to the URL via the browser extension 120. Thus, each record 162 in the database 160 may include a user identifier 164, an account identifier 166, a URL 168, attributes 170 extracted from and added to the digital content associated with the URL, and/or tags 172 assigned to the URL. In addition to these fields, each record can include a date the record was last updated.

The portal 140 can include one or more multi-channel harvesting engines 146 configured to implement harvesting algorithms. The harvesting algorithms can be configured to search/crawl the web, the dark web; interface with search engines and/or APIs to search webpages (including marketplace webpages), collect social media feeds, collect potential phishing emails and landing pages, search for mobile applications and associated data, collect paid search advertisement or piracy events, and/or to capture any other digital content in a networked environment. The one or more multi-channel harvesting engines 146 can generate or build one or more queries (e.g., database, API or web-based queries) using the harvesting algorithms and the queries can be based on the one or more search terms (e.g., key words) and/or uniform resource locators input by one or more users via graphical user interfaces 144 and/or can generate or build one or more queries autonomously. In exemplary embodiments, the portal 140 can autonomously refine the harvesting algorithm based on the data received from the browser extension. The one or more multi-channel harvesting engines 146 can implement the harvesting algorithms to build several queries from a single set of search terms, where each query can be specific to a search engine and/or application program interface (API).

The one or more multi-channel harvesting engines 146 can execute at least some of the queries with search engines and/or APIs, which can return URLs or Internet content and/or any other content in a networked environment. As one example, execution of the one or more multi-channel harvesting engines 146 can return one or more URLs or webpages from one or more Internet domains hosted by one or more web servers at one or more data sources. In some embodiments, the search results can be returned as a list and the one or more multi-channel harvesting engines 146 can limit the quantity of results to be processed by the portal 140. As a non-limiting example, the one or more multi-channel harvesting engines 146 can select, e.g., the first one hundred URLs or webpages listed in the search results (or the first ten pages of search results) or any suitable quantity of results. The results returned via the one or more multi-channel harvesting engines 146 can include, for example, webpages, social media feeds, potential phishing email and landing pages, mobile applications and associated data, paid search advertisement or piracy events.

The one or more multi-channel harvesting engines 146 can be programmed to facilitate parallel searching of various data channels and/or data sources. The queries can be generated or built using one or more query languages, such as Structured Query Language (SQL), Contextual Query Language (CQL), proprietary query languages, domain specific query languages and/or any other suitable query languages. In some embodiments, the coarse harvesting engine 146 can generate or build one or more queries using one or more programming languages or scripts, such as Java, C, C++, Perl, Ruby, and the like.

An extraction engine 148 can parse the results returned from the harvesting engines 146 and extract attributes from each result (e.g., each webpage). As the extraction engine 120 extracts the attributes from each result, the extraction engine 120 builds an attribute database 130 (e.g., a relational or NoSQL database) of the attributes. For example, a record can be created for each result (e.g., each webpage) in the harvested data set 117, and each attribute extracted from a result can correspond to a field in its corresponding record. The attributes extracted from the results to create the records can include information that may be useful in assessing whether each result corresponds to benign or malignant content. The attributes extracted from the results and stored fields of the database 130 can be, for example: uniform resource locators, registrant names of the domain for a webpage; names of servers that host the digital content; raw data such as a HTML page source code, XML files, JavaScripts; product names; product descriptions; seller names; geographic locations of a server, a registrant, a seller; geographic locations to which sellers ship products; seller reviews; titles of the result (e.g., a title of the webpage); numbers such as a price, a quantity of a product available for purchase; marketplace-specific identifiers; images, such as product images, logos, and/or artwork; other media, such as video and/or audio and the like.

To extract the attributes from the results, the extraction engine 148 can use, for example, natural language processing, machine learning, similarity measures, image matching techniques, and/or pattern matching techniques to identify attributes in the results. The extraction engine 148 can utilize one or more ontologies of entities to derive and/or identify entities (e.g., sellers) included in the results. Various algorithms and/or techniques can be utilized by the extraction engine 148. For example, algorithms for fuzzy text pattern matching, such as Baeza-Yates-Gonnet can be used for single strings and fuzzy Aho-Corasick can be used multiple string matching; algorithms for supervised or unsupervised document classification techniques can be employed after transforming the text documents into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

Referring again to the browser extension 120, the one or more graphical user interfaces 124 can be embedded in a window of the web browser 110 (e.g., as a frame) and/or can be selectively displayed as pop-up windows or menus. The graphical user interfaces 124 can allow users to interact with the browser extension 120. In some embodiments, the one or more graphical user interfaces 124 can be generated as separate windows such that the one or more graphical user interfaces 124 are formed as separate and distinct browser windows.

The one or more graphical user interfaces 124 can include data output areas to display information to users and/or data entry fields that can be selected by the users (e.g., menu options, selection tools) and/or that can be configured to receive information from the users. Some examples of data output areas can include, but are not limited to text, graphics (e.g., graphs, maps—geographic or otherwise, images, and the like), and/or any other suitable data output areas. Some examples of data entry fields can include, but are not limited to text boxes, check boxes, buttons, dropdown menus, and/or any other suitable data entry fields.

The background processes 126 can be executed in the context of the web browser 110 to interact with the digital content being displayed in the browser window(s) and with the portal 140. For example, the background processes 126 can send messages to the API(s) 142 of the portal 140 to request information from the portal 140 when the web browser 120 navigates to a URL, and can use information received from the portal 140 to modify a presentation of the digital content associated with the URL in the browser window, to insert information into the one or more graphical user interfaces 124 of the browser extension, and/or to dynamically specify options or actions that can be selected by the user via the graphical user interfaces 124.

The markup overlay 128 can be executed to provide a selectable overlay on the browser window of the web browser 110 to allow a user to allow users to interact with the source code or files associated with content being rendered in the browser window. For example, a user can independently and individually select, tag, and mark-up images, text, markup, links, and/or other elements of the content rendered in the browser window.

To facilitate independent and individual selection, tagging, and mark-up of images, text, markup, links, and/or other elements of the content rendered in the browser window, when a webpage is loaded into the browser window by the web browser 110, the markup overlay 128 of the browser extension 120 can monitor user interaction with the webpage and/or the browser window. For example, the markup overlay 128 can monitor movement event (e.g., movements a mouse, keystrokes, user gestures on a touch screen), selection events (e.g., clicking, double clicking, tapping, double tapping, via a mouse, user gesture, or keyboard), and hovering events (e.g., where a cursor or pointer of is placed over a specific location/element without or before receiving a selection event associated the specific location/element). In some embodiments, the markup overlay 128 can execute as a script to facilitate the monitoring.

By monitoring the user interaction via the markup overlay 128, the browser extension 120 can perform one or more actions associated with one or more elements in response to movement events hovering events, and/or selection events. For example, each movement event, hovering event, and/or selection event can emit an event signal that can be used by the markup overlay 128 to facilitate independent and individual selection, tagging, and mark-up of images, text, markup, links, and/or other elements of the content rendered in the browser window. The event signals can include and be used to ascertain a size of the element(s), a position of the element(s) in the webpage, as well as other attributes associated with the element(s), such as a filename, tags associated with the element, and a type of element such image, strings, or links. The markup overlay 128 listens for event signals associated with movement events, hovering events, and/or selection events, and can perform different actions when each type of event is detected. As one example, detected hover events (e.g., based on hovering event signals) can be used by the markup overlay 128 to find and outline elements as the cursor or pointer moves. As another example, detected selection events (e.g., based on selection event signals) can be used by the markup overlay 128 to display contextual menus and capture user input/selections.

As one non-limiting example of the effect of hovering, a user can move a cursor to hover over a target (e.g., an HTML element) in a webpage (e.g., a hovering event) and an event signal (a hovering event signal) can be emitted that includes the element the user is currently hovering over. The markup overlay 128 can receive or intercept the event signal from the web browser 110 to ascertain a size of the element and/or a position of the element in the browser window. Based on the size and position of the element, the markup overlay 128 can draw a border around the element rendered in the browser window. In response to the event signal, the markup overlay 128 can also ascertain attributes of the element (e.g. the filename of an image, tags associated with the element, a type of element such image, strings, links).

As another example, when a user clicks on a portion of a webpage in a browser window (e.g., a selection event), an event signal (e.g., a selection event signal) is emitted by the web browser 110 and the markup overlay 128 can perform an action that is different than the action performed when a hovering event is detected (e.g., based on a hovering event signal). In some embodiments, the markup overlay 128 of the browser extension 120 can prevent a default action associated with the selection event from being performed by the web browser 110, e.g., prevent the web browser from performing a page redirect if a link in the webpage is selected. Instead, the markup overlay 128 of the browser extension 120 render one or more menus and/or related supplementary information in response to the selection events. The menus can be displayed relative to the selected element or to the position of the cursor or pointer, e.g., of the user's mouse, as the markup overlay 128 can know the location of both the selected element and the cursor or pointer. The one or more menus can display contextual options/information based on the element type (e.g. actions related to strings/phrases for a <p> tag, actions related to logos for <img> tags) for a selected element. For example, a first menu having a first set of options or actions can be presented when the element is an image, a second menu having a second set of options or actions can be presented when the element is a string, and a third menu having a third set of options or action can be presented when the element is a link.

Some examples of menu options or actions can include, for example, the ability to identify the selected element as being benign or malignant, identifying and selecting contextual attributes from webpage in support or in opposition of identifying the selected element as being benign or malignant, identifying elements and/or contextual attributes that are missing from or expected in the content, harvesting the selected element, the identification of the element as benign or malignant, and/or the contextual attributes to import into the portal 140. As one example, the user can identify and add strings, images, and/or links in the content as contextual attributes via the menu of options. As another example, the user can input elements or contextual attributes that the user expects to be in the webpage, but are not or that the users would need to determine whether one or more elements in the webpage are in compliance. For example, if a webpage is supposed to contain a particular phrase or image, but does not, users can inform identify the particular phrase or image as missing via the graphical user interface and menus of the browser extension, and the browser extension can send this data to the portal 140 to be stored with the records for the content, to generate a new policy, and/or to generate or update a score associated with the content, the content distributor, and/or the content owner.

In some embodiments, the browser extension 120 can present user with a cascade of related questions to fill in the context of the content rendered by the web browser. For example, when a user identifies an element in content (e.g., a logo in a webpage) as a false positive, the contextual menu can be dynamically generated to request additional information by asking the user to check additional applicable attributes/metadata, e.g., the content (e.g., webpage or site) is trusted or untrusted for this brand/vertical/account, the element (e.g., the logo) is not approved for use in this site/context (which can cause the browser extension to prompt the user for additional information as to why the element is not approved), verbiage associated with the element (e.g., the logo) is missing.

The contextual attributes specified for elements in content can be used in conjunction with the elements and the other information about the content to discover, create, and refine policies from reporting/categorization trends. The relationships between policies and contexts can be mapped to potentially present these additional questions dynamically. As similar policies are generated, the portal 140 can train one or more machine learning algorithms to dynamically specify the contextual menu. For example, the portal 140 via the browser extension can autonomously generate one or more inquiries based on historic data (e.g. the portal 140 ask "is this what you're looking for" or "did you expect this string to (not) appear?", etc.)

In exemplary embodiments, the markup overlay 128 can map the elements of the content rendered in the browser window to their corresponding segments of the underlying in-memory version of the source code or file used by the browser to render the elements in the browser window. For example, a user can select an image included in the content rendered in the browser window via the markup overly 128, which can result in the image being highlighted. In response to selection of the image, the markup overlay 128 can identify the segment of the underlining source code or file that corresponds to the image (e.g., which can include a file name for the image). The user can select one or more options to instruct the markup overlay 128 to perform one or more options, such as marking or tagging the image or the corresponding segment of the source code of the file, transmitting the image and/or the corresponding segment of the source code or file (e.g., the file name) to the portal for creation of or inclusion in a database record in the portal 140, e.g., via the backend processes 126, and/or autonomously updating a harvesting algorithm utilized by the portal to discover content in the networked environments.

As a non-limiting example, in an exemplary operation, when an instance of the web browser 110 is launched, the web browser 110 loads an instance of the browser extension 120 such that the user interface 122, the background processes 126, and/or the markup overlay 128 are executed in conjunction with the web browser 110. The browser extension 120 can request (e.g., via the one or more graphical interfaces 124) user credentials from a user of the web browser 110. Upon receipt of the user credentials, the background processes 126 of the browser extension 120 can attempt to establish a connection with the portal 140 by transmitting a message to the portal 140 including the user credentials. After the portal 140 authenticates the user credentials, the portal transmits a message back to the browser extension 120 indicating that a connection has been established between the browser extension 120 and the portal 140.

Subsequently, the web browser 110 can navigate to a webpage 102 having an associated URL. For example, the user can enter a URL in the address bar of the web browser 110, can select a link embedded in content rendered in the browser window, can enter text into a data entry field of a search engine, and/or can select a URL from a list of URLs rendered in one of the graphical user interfaces 124. The list URLs can be generated by the portal 140 based on the harvesting algorithms 148 implemented by harvesting engines 144 of the portal 140 and can represent URLs to be reviewed for content that includes malignant or benign elements.

In some embodiments, the background processes 126 of the browser extension 120 can incorporate the URL of the webpage 102 into a message in response to the web browser 110 navigating to the webpage 102, and transmits the message to the API(s) 142 of the portal 140. The API(s) 142 can create one or more database queries based on the message. The one or more database queries can be structured to search a database for records associated with the URL received in the message that are specific to the user identifier and/or account number associated with the established connection between the portal 140 and the browser extension 120 (e.g., the database queries can be configured to search for a record that corresponds to the URL in a set of records associated with the user of the web browser 110 and browser extension 120).

The results of the one or more queries can be transmitted back to the background processes 126 of the browser extension 120 by the API(s) 142 of the portal 140. As one example, if no record corresponding to the URL was returned in response to the one or more queries, the API(s) 142 can transmit a message that indicates that there is no record for the URL (e.g., the message can include a null set for the results). In response to receiving the message indicating that no record was found, the background processes 126 can control the one or more graphical user interfaces 124 to generate an indicator to the user that there is no records for the URL, can modify the presentation of the webpage or the browser tab associated with the webpage to insert an indicator that indicates that there is no record for the URL, can interact with the markup overlay to dynamically specify options or action that can be selected or performed with respect to elements of the webpage 102. In exemplary embodiments, the indicator can be a graphical icon and the presentation of the webpage can be modified by modifying the source code associated with the webpage.

As another example, in some embodiments, if a record corresponding to the URL is returned in response to the one or more queries, the API(s) 142 can transmit a message that indicates there is a record for the URL. The message can include the information included in the record corresponding to the URL. For example, the message can include any tags and/or markups stored in the record for specific elements in the webpage. In response to receiving the message indicating that a record was found, the background processes 126 can control the one or more graphical user interfaces 124 to display the tags associated with the URL, can modify the presentation of the webpage 102 or the browser tab associated with the webpage to insert an indicator that corresponds to one of the tags and/or markups assigned to the URL. For example, the background processes 126 can interact with the markup overlay 128 to insert the markups into the in-memory version of the source code and/or highlight elements associated with the markups being rendered in the browser window. As another example, an indicator inserted into the browser window can be a graphical icon and the presentation of the webpage 102 can be modified by modifying the source code associated with the webpage to insert the indicator for one of more of the elements in the webpage 102.

The one or more graphical user interfaces 124 can allow the user to control an operation of the browser extension 120 and the portal 140 in response to selection of one or more options presented in the one or more graphical user interfaces 124. As one example, the user can select an option in the one or more graphical user interfaces 124 that causes the background processes 126 to capture an image of the webpage, which can be stored in the database 160 and associated with a record of the URL associated with the webpage. As another example, the user can select an option in the one or more graphical user interfaces 124 that causes the markup overlay 128 to select an element in the webpage and/or its corresponding segment of source code, assign a specified markup or tag to the selected element and/or its corresponding segment of source code, identifying contextual attributes in the webpage supporting the specified markup or tag, harvest the selected element, the markup or tag, and/or the contextual attributes, and create or modify a record in the database in the portal 140. Harvesting a webpage or elements of a webpage can include extracting attributes from the webpage or elements and creating or updating a record in a database including the extracted attributes as well as a URL for the webpage from which the attributes were extracted and the elements of the webpage. In response to selecting to harvest the webpage, the background processes 126 and/or the portal 140 can autonomously extract attributes from the webpage to add to the record for the URL (e.g., via the extraction engine 148).

In some embodiments, the background processes 126 and/or the portal 140 can be configured to autonomously tag and/or markup specific elements of a webpage. For example, the background processes 126 and/or the portal 140 can be configured to utilize one or more machine learning algorithms to specify tags, select elements via the markup overlay for the webpages, and/or modify the in-memory version of the source code based on the tags and/or markups. The machine learning algorithm can be trained using a corpus of training data including data received by the portal 140 via the browser extension.

In some embodiments, elements in webpages can be autonomously tagged and/or marked-up based on specific known or learned attributes that are associated with previously identified content and/or previously identified elements of the content (e.g., images or text). As an example, if an element in a webpage is an image having a specified file name, the portal 140 can interact with the browser extension 120 to determine whether the image is in compliance with compliance criteria and/or benign. The portal 140 can use image/pixel matching, image signatures or hashes, and/or string similarity measures for the file name of the image to determine whether the image is in compliance with compliance criteria or is benign and can instruct the browser extension to tag or markup the image in the webpage based on the determination.

In exemplary embodiments, the portal 140 can be configured to programmatically determine and provide context to aid users and parsers (e.g., the extraction engine 148) in identifying benign and malignant elements (e.g., whether the elements represent compliance policy violations). To achieve this, the portal 140 can utilize the specific data retuned to the portal 140 from the browser extension 120 to generate generalized rules or learned behavior.

In exemplary embodiments, the browser extension 120 can be configured control the web browser 110 so that the web browser 120 opens multiple browser windows or browser tabs and navigates to a different webpage in each browser window or browser tab. When the web browser 110 operates in this manner, exemplary embodiments of the browser extension 120 and the portal 140 can operate in the same or similar manner has as described herein when processing the URL from one webpage opened in a browser window or browser tab. After the browser extension 120 and the portal 140 communicate to determine whether a record exists in the database 160 for each of the URLs and/or whether the URLs have been tagged or specific elements have been tagged or marked-up, the one or more graphical user interface 124 can be configured to allow the user to perform tagging, markup, and harvesting of the elements in the webpages individually, in groups or subsets, and/or collectively. For example, the web browser 110 can have a quantity of browser tabs open with a different webpage being rendered by each browser tab. Each webpage can include at least one image, and the browser extension 120 and/or portal can determine which of the webpages include identical instances of the image (e.g., based on image/pixel matching, signatures/hashes) such that any action taken with respect to the image in one of the browser tabs or windows is automatically taken for each browser window or tab that rendered an instance of the image.

In one non-limiting application, exemplary embodiments of the environment 100 can be utilized for brand/entity protection and integrity in which determinations about whether digital content includes images and/or text associated with the brand/entity and whether the images and/or text included in the digital content is authenticate, authorized, and/or in compliance with a compliance policy established for the brand or entity (e.g., certain variations or versions of images and/or text may be used, but other variations and/or versions may not be used so that the presence of the brand/entity across the digital channels is uniform and consistent). The portal 140 can define and identify specific indicators for determining whether the images and/or text included in the digital content is authenticate, authorized, and/or in compliance with a compliance policy established for the brand or entity based on input from the browser extension 120 in the form of elements in webpages; markup or tags for the elements indicating whether the elements are or are not authenticate, authorized, and/or in compliance with a compliance policy established for the brand or entity; and/or contextual attributes in the webpages identified in support the assigned markup or tag (surrounding text or images and metadata such as title tags, meta tags, registrant information, content delivery network of the content, new policy definitions, etc.).

The specific indicators can be used by the portal 140 to generate a value that can be utilized to refine a set of results of webpages, elements in the webpages, data sources providing the webpages, and/or identities of entities adding the webpages to the data sources. The indicators can be weighted into an overall policy violation score that can be assigned to each result, where the policy violation score can be an indicator of the likelihood that a result correspond to authenticate, authorized, and/or compliant use of elements associated with the brand or entity. For example, the lower the score, the less likely a result includes elements that are malignant, e.g., not authorized, not authentic, and/or not in compliance. Users of the portal 140 can set a threshold for a minimum score that a result must reach before the result is added to the set of results to be reviewed by the users. Parsers in the portal 140 can calculate the policy violation scores, and the policy violation scores can be used by the parsers to filter out false positives or benign results (e.g., based on their scores) such that false positives and benign results are not included in the set of results.

When the minimum score threshold for returned results is configurable by a user, the portal 140 can one or more ways of specifying the threshold. As one example, the portal 140 can generate a slider in the graphical user interface 144 to increase/decrease the threshold. The policies can be a collection of indicators, and more granular control can be provide to give users the ability to independently weight the various indicators that form the policy.

In exemplary embodiments, the data received by the portal 140 from the browser extension 120 can be extrapolated to generate generalized indicators for identifying authenticate, authorized, and/or compliant use of elements associated with the brand or entity. This extrapolation can be enhanced when the data received from the browser extension not only includes the elements and tags or mark-ups assigned to the elements, but also includes contextual attributes in support of the assigned tags or mark-ups.

For example, the harvesting engine(s) 146 and extraction engine 148 of the portal 140 can return a result from expedia.com that has been flagged as a false positive (e.g., the result is benign and has been assigned a tag or markup for being benign). The context the user adds can be the knowledge that expedia.com is a URL of a trusted travel site and that reputable travel sites are trusted/encouraged to use an element associated with a brand (e.g., a brand's logo). In this specific non-limiting example, a user can identify expedia.com is a trusted site for brands within the 'travel' vertical. Over time, a positive correlation can be built between the URL expedia.com (potentially in any form, be it expedia.com or extensions thereof) and brands/entities within the 'travel' vertical (e.g., Jet Blue). This example can be extended further such that a given URL or domain can be identified as being trusted, while still marking a brand specific image on the URL or domain as a positive indicator due to the URL including an old/bad/incorrect logo (the version of the logo on the webpage, website is not in compliance with compliance policy established for the brand or entity).

Continuing the above illustrative example, results from expedia.com for brands within the travel vertical can have their scores reduced (the amount of the reduction depending on how trusted the site has become within this context) as these results are more likely to be false positives based on similar historic examples. An element, e.g., specific logo of a travel entity can receive an increase in the score in response to the element previously identified as a positive indicator (e.g., the specific logo included on expedia.com was found not to be in compliance). Using this approach, general assertions would be weighted less heavily than specific assertions.

In exemplary embodiments, various factors can contribute to the policy violation score, such as, for example, elements in webpages; markup or tags for the elements indicating whether the elements are or are not authenticate, authorized, and/or in compliance with a compliance policy established for the brand or entity; and/or contextual attributes in the webpages identified in support the assigned markup or tag (surrounding text or images and metadata such as title tags, meta tags, registrant information, content delivery network of the content, new policy definitions, etc.). Additional context can be added by the users of the browser extension 120, such as the element (e.g., a versions of a brand logo) is in compliance for some webpages (e.g., like direct provider websites), but noncompliant for other webpages (e.g., third party sites like Expedia), in which case users can include new policy definitions.

The portal 140 can define a minimum threshold for the policy violation score that a result has to reach in order to be displayed to a user via the graphical user interface 144 of the portal 140. For example, the portal 140 can filter out some of the results based on this threshold to prevent results that are likely false positives from being displayed to the user, e.g., because a score below the threshold can be indicative of similar historic results that were in compliance. In some embodiments, the minimum threshold can be specified by the user of the portal 140, such that the user of the portal can control the volume of results returned.

Figure 1B:
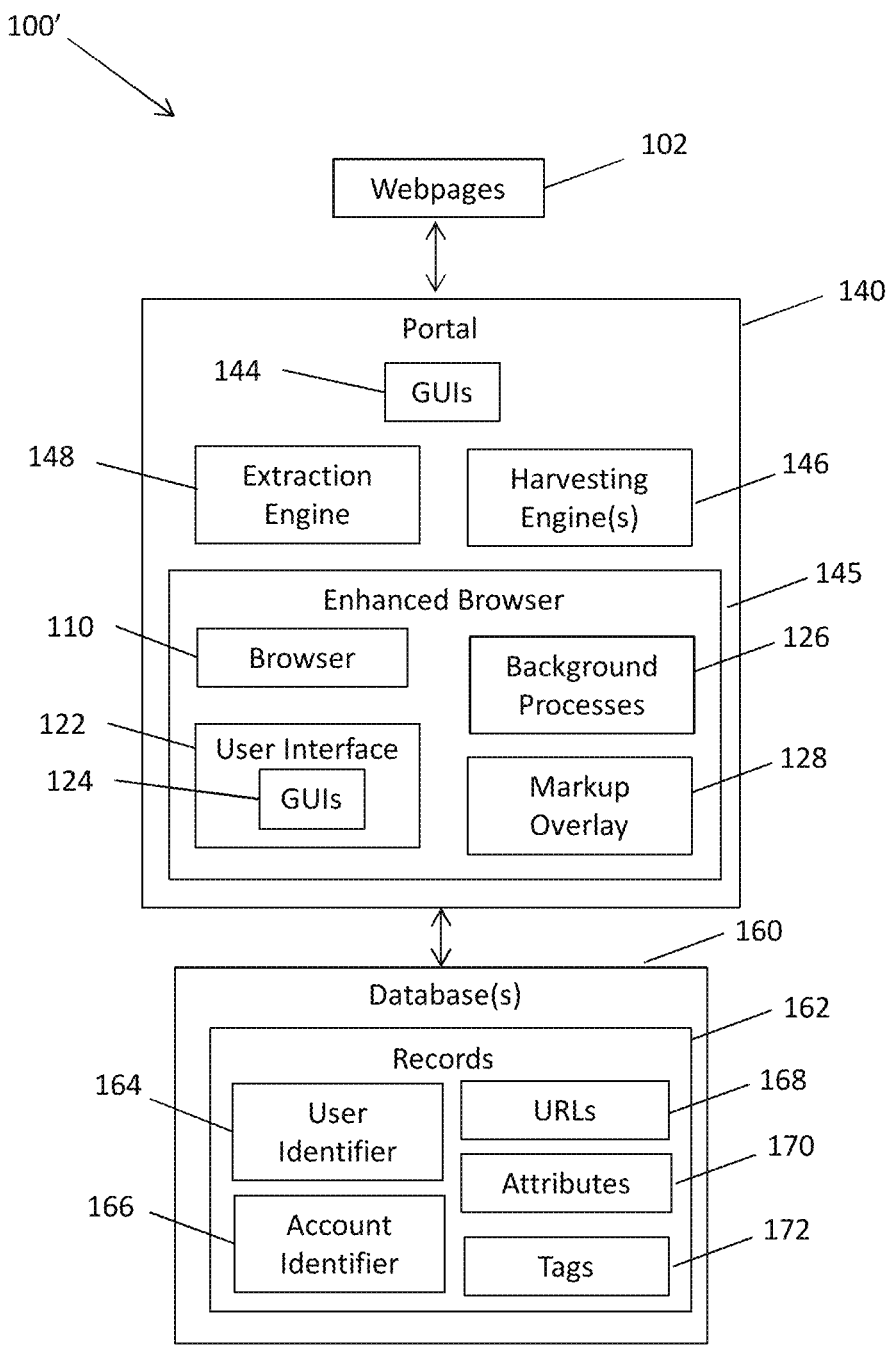
FIG. 1B is a block diagram of another exemplary environment for direct in-browser searching, viewing, markup, tagging, comparison, and harvesting of elements in digital content in a networked environment in accordance with embodiments of the present disclosure.

FIG. 1B is a block diagram of an environment 100' for contemporaneous in-browser searching, viewing, tagging, comparison, and harvesting of digital content in accordance with embodiments of the present disclosure. As shown in FIG. 1B, the present embodiment of the portal 140 can include the GUIs 144, the one or more harvesting engine(s) 146, the extraction engine 148, and databases 160 (including the user identifier 164, the account identifier 166, the URL 168, the attributes 170, and/or the tags 172 for each record 162) as described above with reference to FIG. 1A. The portal 140 can perform the operations and functions described herein with reference to FIG. 1A.

In the present embodiment of the portal 140 can also include an enhanced browser 145 that includes the user interfaces 112, background processes 126, and the markup overlay 128 as described above with reference to FIG. 1A. The present embodiment of the portal 140 can also include browser function 110'. In exemplary embodiments, the enhanced browser 145 can combine the operations and functionality of the web browser 110 and the browser extension 120 to provide for contemporaneous in-browser searching, viewing, markup, tagging, comparison, and harvesting content in a networked environment, and ultimately, can facilitate removal of malignant content from the networked environment. The enhanced browser 145 can execute the browser function 110' to retrieve and display digital content hosted by one or more servers, e.g., based on uniform resource identifiers (URIs) or uniform resource locators (URLs) associated with the digital content. For example, the enhanced browser 145 can query one or more webservers hosting digital content in the form of one or more webpages 102 using URIs or URLs, and can retrieve and display the one or more webpages 102 based on the URIs or URLs in the same manner as the web browser 110 shown in FIG. 1A. The browser function 110' can be executed to process the webpages or files retrieved from one or more servers to display the digital content to a user, and can use one or more plug-ins (e.g., Flash applications, Java applets). The enhanced browser 145 can open digital content in multiple browser windows or browser tabs at the same time.

The enhanced browser 145 can provide a dynamic browsing environment in which the enhanced browser 145 responds to the digital content being display in a browser window of the enhanced browser 145 and/or the URL associated with the digital content being displayed. In exemplary embodiments, the dynamic behavior of the enhanced browser 145 can be achieved in response to an interaction between the background processes 126, the markup overlay 128, and the browser function 110', and/or between the enhanced browser 145, the GUIs 144, the harvesting engine(s) 146, the extraction engine 148, and the databases 160.

The one or more graphical user interfaces 124 can be embedded in a window of the enhanced browser 145 (e.g., as a frame) and/or can be selectively displayed as pop-up windows or menus to allow users to interact with the enhanced browser 145. In some embodiments, the one or more graphical user interfaces 124 can be generated as separate windows such that the one or more graphical user interfaces 124 are formed as separate and distinct windows.

The background processes 126 can be executed in the context of the enhanced browser to interact with the digital content being displayed in the browser window(s) and with the harvesting engine(s) 146, the extraction engine 148, and the databases 160. For example, the background processes 126 can request information from the harvesting engine(s) 146, the extraction engine 148, and/or the databases 160 when the enhanced browser 145 navigates to a URL. The enhanced browser can use the information to modify a presentation of the digital content associated with the URL in the browser window, to insert information into the one or more graphical user interfaces 124, and/or to dynamically specify options or actions that can be selected by the user via the graphical user interfaces 124.

The markup overlay 128 can be executed to provide a selectable overlay on the browser window of the enhanced browser 145 to allow users to interact with the source code or files associated with content being rendered in the browser window of the enhanced browser 145. For example, a user can independently and individually select, tag, and mark-up images, text, markup, links, and/or other elements of the content rendered in the browser window via the markup overlay 128 as described herein. For example, as described herein, to facilitate independent and individual selection, tagging, and mark-up of images, text, markup, links, and/or other elements of the content rendered in the browser window, when a webpage is loaded into the browser window by the enhanced browser 145, the markup overlay 128 of the enhanced browser can monitor user interaction with the webpage and/or the browser window. For example, the markup overlay 128 can monitor movement event (e.g., movements a mouse, keystrokes, user gestures on a touch screen), selection events (e.g., clicking, double clicking, tapping, double tapping, via a mouse, user gesture, or keyboard), and hovering events (e.g., where a cursor or pointer of is placed over a specific location/element without or before receiving a selection event associated the specific location/element). In some embodiments, the markup overlay 128 can execute as a script to facilitate the monitoring. By monitoring the user interaction via the markup overlay 128, the enhanced browser 145 can perform one or more actions associated with one or more elements in response to movement events hovering events, and/or selection events as described herein with reference to FIG. 1A.

As a non-limiting example, the enhanced browser 145 can navigate to the webpage 102 having an associated URL. For example, the user can enter a URL in an address bar of the enhanced browser 145, can select a link embedded in content rendered in the browser window of the enhanced browser 145, can enter text into a data entry field of a search engine, and/or can select a URL from a list of URLs rendered in one of the graphical user interfaces 124. The list of URLs can be generated by the portal 140 based on the harvesting algorithms 148 implemented by harvesting engines 144 of the portal 140 and can represent URLs to be reviewed for content that includes malignant or benign elements.

In some embodiments, the background processes 126 of the enhanced browser 145 can create one or more database queries based on the URL of the webpage 102. The one or more database queries can be structured to search a database for records associated with the URL that are specific to the user identifier and/or account number. If no record corresponding to the URL was returned in response to the one or more queries, a message that indicates that there is no record for the URL (e.g., the message can include a null set for the results) can be returned to the enhanced browser 145 and the background processes 126 can control the one or more graphical user interfaces 124 to generate an indicator to the user that there is no records for the URL, can modify the presentation of the webpage or the browser tab associated with the webpage to insert an indicator that indicates that there is no record for the URL, can interact with the markup overlay to dynamically specify options or action that can be selected or performed with respect to elements of the webpage 102. In exemplary embodiments, the indicator can be a graphical icon and the presentation of the webpage can be modified by modifying the source code associated with the webpage.

As another example, in some embodiments, if a record corresponding to the URL is returned in response to the one or more queries, information included in the record corresponding to the URL can be returned, and the background processes 126 can control the one or more graphical user interfaces 124 to display the tags associated with the URL, can modify the presentation of the webpage 102 or the browser tab associated with the webpage to insert an indicator that corresponds to one of the tags and/or markups assigned to the URL. For example, the background processes 126 can interact with the markup overlay 128 to insert the markups into the in-memory version of the source code and/or highlight elements associated with the markups being rendered in the browser window. As another example, an indicator inserted into the browser window can be a graphical icon and the presentation of the webpage 102 can be modified by modifying the source code associated with the webpage to insert the indicator for one of more of the elements in the webpage 102.

The one or more graphical user interfaces 124 can allow the user to control an operation of the enhanced browser 145 in response to selection of one or more options presented in the one or more graphical user interfaces 124. As one example, the user can select an option in the one or more graphical user interfaces 124 that causes the background processes 126 to capture an image of the webpage, which can be stored in the database 160 and associated with a record of the URL associated with the webpage. As another example, the user can select an option in the one or more graphical user interfaces 124 that causes the markup overlay 128 to select an element in the webpage and/or its corresponding segment of source code, assign a specified markup or tag to the selected element and/or its corresponding segment of source code, identifying contextual attributes in the webpage supporting the specified markup or tag, harvest the selected element, the markup or tag, and/or the contextual attributes, and create or modify a record in the database 160.

In some embodiments, the background processes 126 can be configured to autonomously tag and/or markup specific elements of a webpage. For example, the background processes 126 can be configured to utilize one or more machine learning algorithms to specify tags, select elements via the markup overlay for the webpages, and/or modify the in-memory version of the source code based on the tags and/or markups. The machine learning algorithm can be trained using a corpus of training data including data received from the GUIs 144, the harvesting engine(s) 146, and the extraction engine 148.

In some embodiments, elements in webpages can be autonomously tagged and/or marked-up based on specific known or learned attributes that are associated with previously identified content and/or previously identified elements of the content (e.g., images or text). As an example, if an element in a webpage is an image having a specified file name, the enhanced browser 145 can determine whether the image is in compliance with compliance criteria and/or benign, e.g., based on image/pixel matching, image signatures or hashes, and/or string similarity measures for the file name of the image to determine whether the image is in compliance with compliance criteria or is benign and can tag or markup the image in the webpage based on the determination.

In exemplary embodiments, the portal 140 can be configured to programmatically determine and provide context to aid users and parsers (e.g., the extraction engine 148) in identifying benign and malignant elements (e.g., whether the elements represent compliance policy violations). To achieve this, the portal 140 can utilize the specific data returned to the portal 140 from the enhanced browser 145 to generate generalized rules or learned behavior.

In exemplary embodiments, the enhanced browser 145 opens multiple browser windows or browser tabs and navigates to a different webpage in each browser window or browser tab. When the enhanced browser 145 operates in this manner, exemplary embodiments of the enhanced browser 145 can operate in the same or similar manner has as described herein when processing the URL from one webpage opened in a browser window or browser tab. After the portal 140 determines whether a record exists in the database 160 for each of the URLs and/or whether the URLs have been tagged or specific elements have been tagged or marked-up, the one or more graphical user interface 124 can be configured to allow the user to perform tagging, markup, and harvesting of the elements in the webpages individually, in groups or subsets, and/or collectively. For example, the enhanced browser 145 can have a quantity of browser tabs open with a different webpage being rendered by each browser tab. Each webpage can include at least one image, and the enhanced browser can determine which of the webpages include identical instances of the image (e.g., based on image/pixel matching, signatures/hashes) such that any action taken with respect to the image in one of the browser tabs or windows is automatically taken for each browser window or tab that rendered an instance of the image.

The portal 140 can define and identify specific indicators for determining whether the images and/or text included in the digital content is authenticate, authorized, and/or in compliance with a compliance policy established for the brand or entity based on input from the enhanced browser 145 in the form of elements in webpages; markup or tags for the elements indicating whether the elements are or are not authenticate, authorized, and/or in compliance with a compliance policy established for the brand or entity; and/or contextual attributes in the webpages identified in support the assigned markup or tag (surrounding text or images and metadata such as title tags, meta tags, registrant information, content delivery network of the content, new policy definitions, etc.). The specific (weighted) indicators can be used by the portal 140 as described herein (e.g., to generate a value—a policy violation score).

While an embodiment of the enhanced browser has been described as being included in an embodiment of the portal, in exemplary embodiments, the enhanced browser can be a stand-alone application that interfaces with the portal in a similar manner as the embodiment of the browser extension described with reference to FIG. 1A. As one non-limiting example, a native desktop application can embed or incorporate a browser or browser engine such as webkit or blink and the native desktop application can form the enhanced browser.

Figure 2:
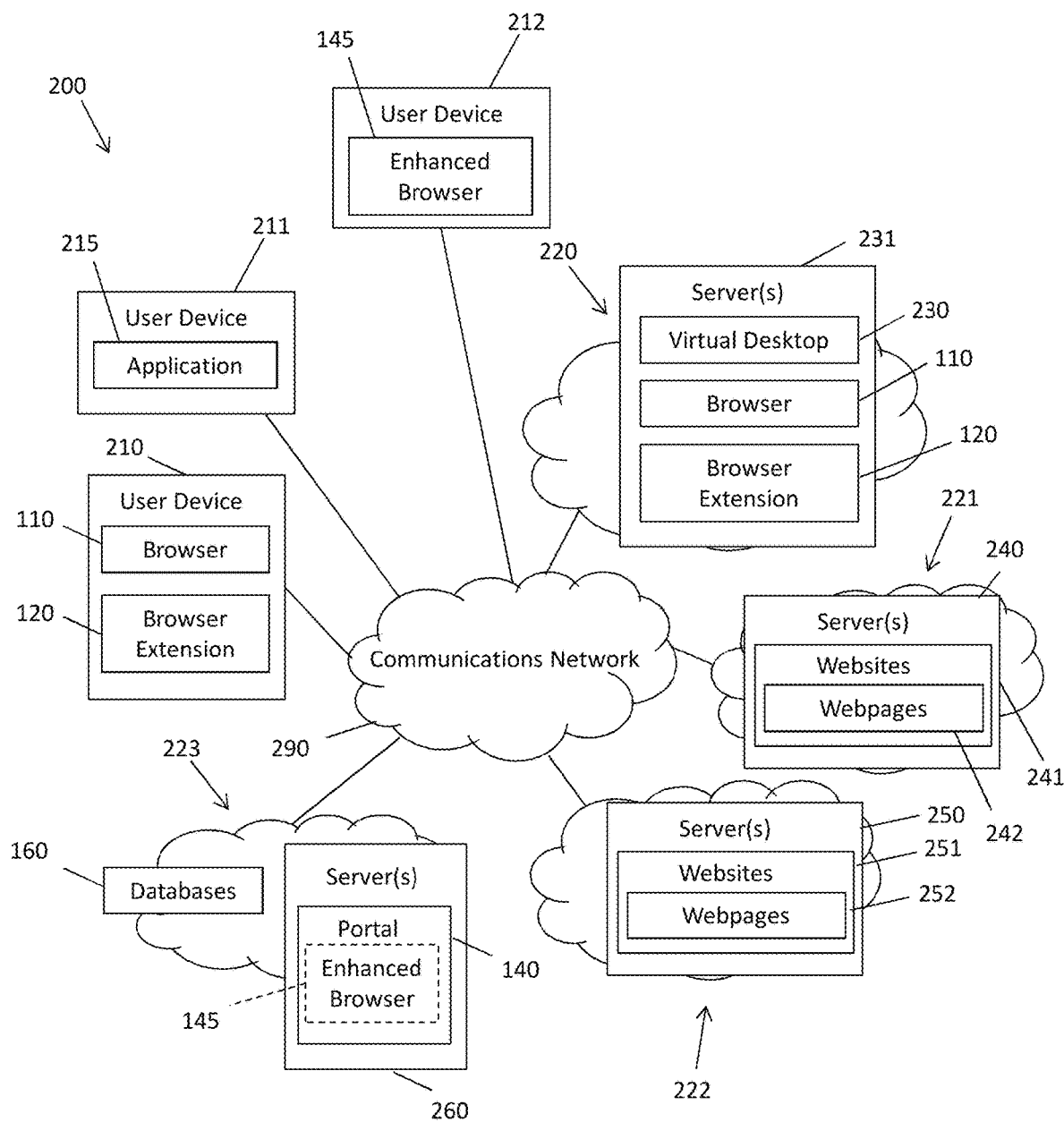
FIG. 2 is an exemplary networked environment for facilitating direct in-browser searching, viewing, markup, tagging, comparison and harvesting of elements in digital content on the Internet in accordance with embodiments of the present disclosure.

FIG. 2 is an exemplary networked environment 200 for facilitating contemporaneous in-browser searching, viewing, tagging, comparison, and harvesting of digital content and/or elements in digital content on the Internet or other networked environments in accordance with embodiments of the present disclosure. The environment 200 includes user computing devices 210-211, remote computing system 220-223, and a communications network 290.

As shown in FIG. 2, the user computing device 210 includes the web browser 110 and the browser extension 120 and the computing device 212 includes the enhanced browser 145. For example, the enhanced browser 145 included on the computing device 212 can be a native desktop application that embeds or incorporates a browser or browser engine such as webkit or blink. Implementing the enhanced browser 145 as a native desktop application on the computing device 212 can be beneficial in the event that security or sandbox restrictions would prevent some functionality of a separate browser extension. The user computing device 211 includes a client-side application 215 configured to interface with the remote computing system 220 to create a virtual desktop 230 for the user computing device 211 at the remote computing system 220. The remote computing system 220 can include one or more servers 231 that are configured to implement the virtual desktop 230 and include the web browser 110 and the browser extension 120 such that the one or more servers 231 execute the web browser 110 and the browser extension 120 on behalf of the user computing device 211 and in response to instructions received from the user computing device 211 and as if the web browser 110 and browser extension 120 are being executed at the user computing device 211.

The remote computing systems 221-222 can include one or more servers 240 and 250, respectively, configured to host digital content. For example, the one or more servers 240 and 250 can be implemented as webservers that are configured to host websites 241 and 251, respectively, where the websites 241 and 251 each include webpages 242 and 252, respectively. The web browser 110 implemented by the user computing device 210 and the remote computing system 220 can be configured to navigate to the websites 241 and 251 hosted by the servers 240 and 250, respectively.

The remote computing system 223 can include one or more servers 260 configured to implement the portal 140 and can include the one or more databases 160. In some embodiments, the portal 140 may or may not include an embodiment of the enhanced browser 145. Those skilled in the art will recognize that the databases 160 can be incorporated into one or more of the servers 260 such that one or more of the servers 260 can include the databases 160. In some embodiments, the one or more servers 260 executing the portal 140 can interact with the servers 250 and 260 of the remote computing systems 221-222, respectively, to access and retrieve webpages to be processed by the portal 140.

The communications network 290 can be any network over which information can be transmitted between devices communicatively coupled to the network. For example, the communication network 290 can be the Internet, an Intranet, virtual private network (VPN), wide area network (WAN), local area network (LAN), and the like.

In an exemplary operation, when an instance of an enhanced browser environment is launched by the user computing device 210 or 212 and/or the one or more servers 260 or 231. The enhanced browser environment can be for example an instance of the enhanced browser 145 or an instance of the web browser 110 with the browser extension 120 loaded. The user interface 122, the background processes 126, and the markup overlay 128 can be executed in conjunction with the enhanced browser environment by the user computing device 210 or 212 and/or the one or more servers 260 or 231. For embodiments in which the enhanced browser environment includes the browser extension 120, the browser extension 120 requests (e.g., via the one or more graphical interfaces 124) user credentials from a user of the web browser 110. Upon receipt of the user credentials, the background processes 126 of the browser extension can be executed by the user computing device 210 and/or the one or more servers 231 to attempt to establish a connection with the remote computing system 223 by transmitting a message to the remote computing system 223 including the user credentials. The one or more servers 260 can execute the portal 140 to authenticate the user credentials, and the one or more servers 260 can transmit a message back to the browser extension 120 in response on operation of the portal 140 to indicate that a connection has been established between the user computing device 210 or the one or more servers 231 and the one or more servers 260. For embodiments in which the enhanced browser environment includes the enhanced browser 145, the user can log into the portal using the user credentials to access the enhanced browser.

Subsequently, the enhanced browser environment can navigate to a webpage 102 having an associated URL by querying of the servers of the remote computing system 221 or 222 based on the URL. The queried server can return a webpage to the user computing system 210 or 212 and/or the one or more servers 260 or 231 executing the enhanced browser 145, which can render the webpage in the a browser window of the enhanced browser environment and store an in-memory version of the source code for the webpage in memory (e.g., in the memory associated with the user computing device 210 or 212 or in the memory associated with the one or more servers 260 or 231). In response to the enhance browser environment navigating to the webpage 102, the background processes 126 of the enhanced browser environment can incorporate the URL of the webpage into a message, and transmit the message to the one or more servers 260 for processing by the portal 140, which can create one or more database queries based on the message, or the background processes 126 can query the one or more databases directly. The one or more database queries can be structured to search a database for records associated with the URL received in the message that are specific to the user identifier and/or account identifier associated with the user of the enhanced browser environment (e.g., an established connection between the user computing device 210 and the one or more servers 260 and/or between the one or more servers 231 and the one or more servers 260 and/or based on the user logging into the portal 14), e.g., the database queries can be configured to search for a record correspond to the URL in a set of records associated with the user of the enhanced browser environment. The results of the one or more queries can be transmitted back to device(s) executing the enhanced browser environment by the one or more servers 260 for processing by the background processes 126 of the enhanced browser environment as described herein. For embodiments in which the enhanced browser environment is being executed by the server(s) 260, the background processes can query and receives the results from the databases 160.

Figure 3:
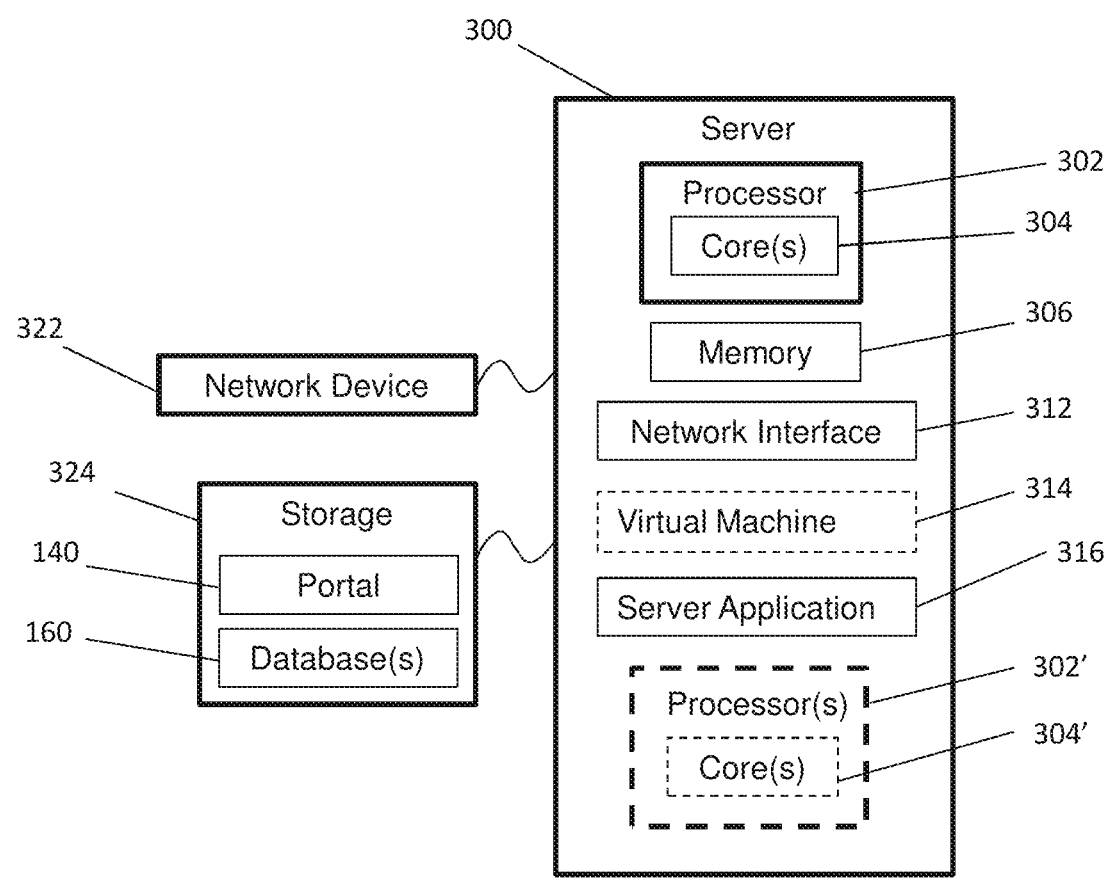
FIG. 3 is a block diagram of an exemplary server in accordance with embodiments of the present disclosure.

FIG. 3 is a block diagram of an exemplary server 300 in accordance with embodiments of the present disclosure. In the present embodiment, the server 300 is programmed and/or configured to execute one of more of the operations and/or functions of the portal 140. The server 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the server 300 may store computer-readable and computer-executable instructions or software for implementing exemplary embodiments of the portal 140 or portions thereof.

The server 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the server 300 so that infrastructure and resources in the computing device may be shared dynamically. One or more virtual machines 314 may be provided to handle a process running on multiple processors so that the process appears to be using only one computing resource rather than multiple computing resources, and/or to allocate computing resources to perform functions and operations associated with the portal 140. Multiple virtual machines may also be used with one processor or can be distributed across several processors.

Memory 306 may include a computer system memory or random access memory, such as DRAM, SRAM, EDO RAM, and the like. Memory 306 may include other types of memory as well, or combinations thereof.

The server 300 may also include one or more storage devices 324, such as a hard-drive, CD-ROM, mass storage flash drive, or other computer readable media, for storing data and computer-readable instructions and/or software that can be executed by the processing device 302 to implement exemplary embodiments of the portal 140 described herein.

The server 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the server 300 to any type of network capable of communication and performing the operations described herein. While the server 300 depicted in FIG. 3 is implemented as a server, exemplary embodiments of the server 300 can be any computer system, such as a workstation, desktop computer or other form of computing or telecommunications device that is capable of communication with other devices either by wireless communication or wired communication and that has sufficient processor power and memory capacity to perform the operations described herein.

The server 300 may run any server application 316, such as any of the versions of server applications including any Unix-based server applications, Linux-based server application, any proprietary server applications, or any other server applications capable of running on the server 300 and performing the operations described herein. An example of a server application that can run on the computing device includes the Apache server application.

Figure 4:
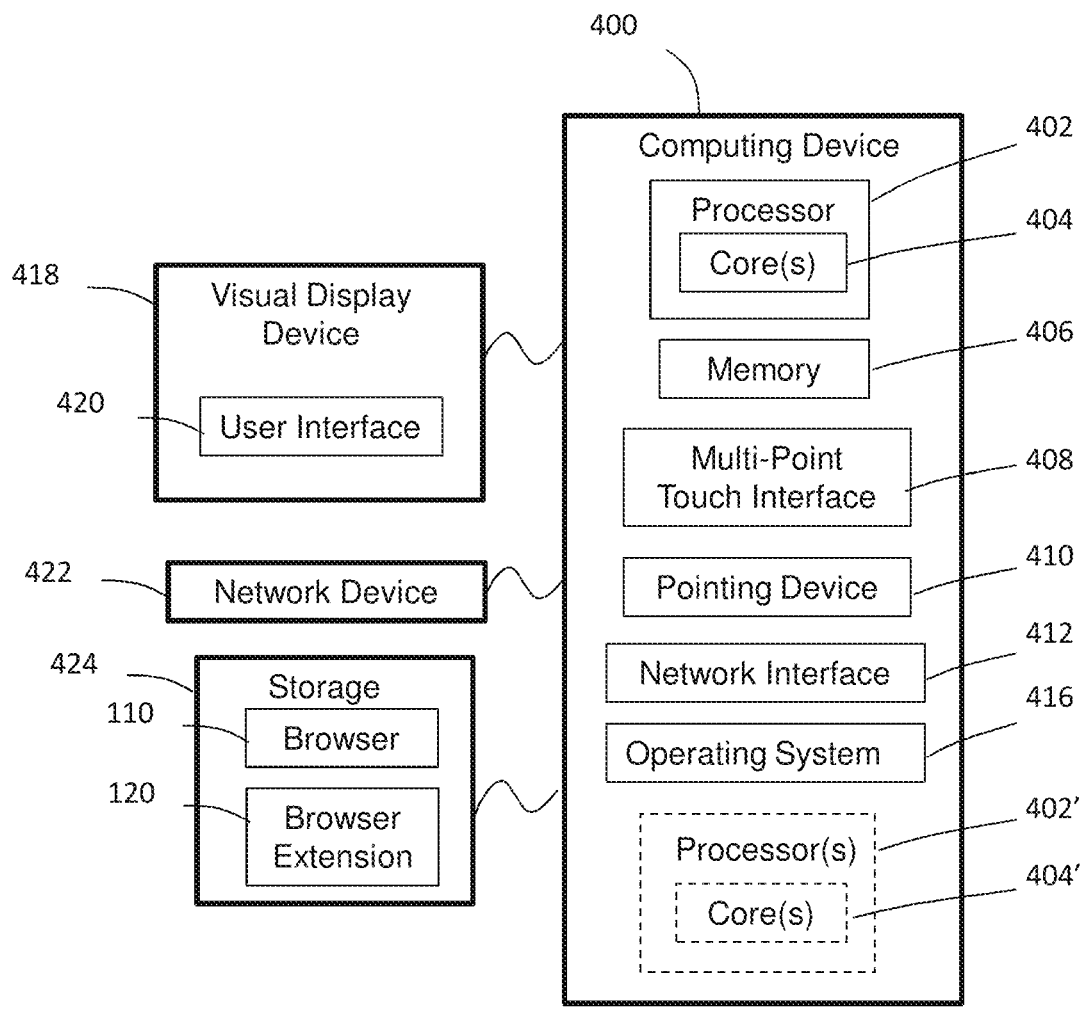
FIG. 4 is a block diagram of an exemplary computing device in accordance with embodiments of the present disclosure.

FIG. 4 is a block diagram of an exemplary user computing device 400 that may be used in to implement exemplary embodiments of the web browser 110 and the browser extension 120. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the web browser 110 and the browser extension 120. The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more user interfaces 420 that may be provided in accordance with exemplary embodiments. The computing device 400 may include other I/O devices for receiving input from a user, for example, a keyboard or any suitable multi-point touch interface (e.g., keyboard) 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the portal 140 described herein. Exemplary storage device 424 may also store information required to implement exemplary embodiments. For example, exemplary storage device 424 can store information, such as a browser history and/or one or more files created by the browser extension to facilitate communication between the browser extension 120 and the portal 140.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 5:
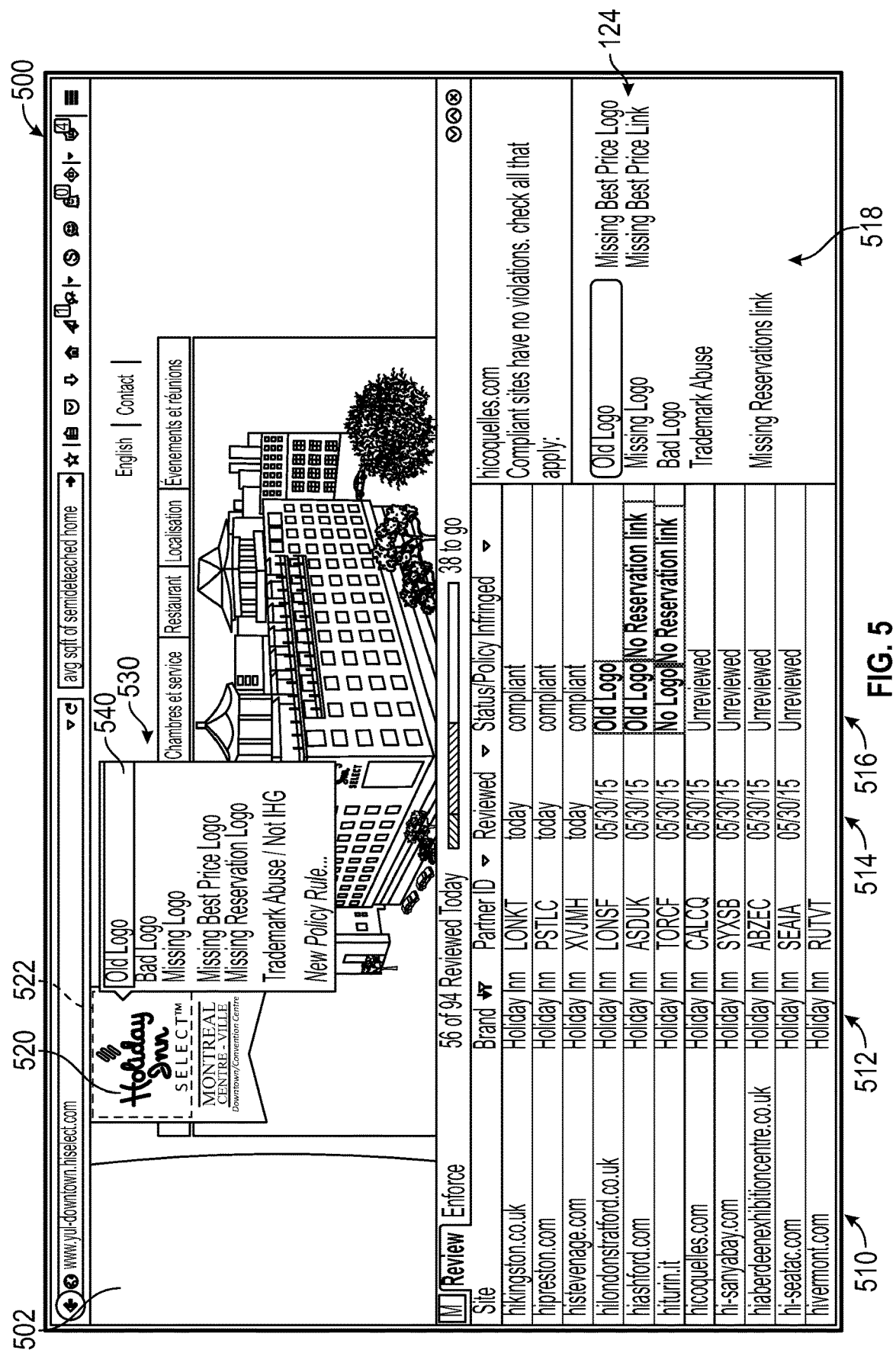

FIG. 5 depicts a webpage 502 opened in a browser window 500 of the enhanced browser environment (e.g., an embodiment of the enhanced browser 145 or an embodiments of the web browser 110 with an embodiment of the browser extension 120 loaded). The enhanced browser environment can be implemented to facilitate contemporaneous in-browser searching, viewing, tagging, comparison, and harvesting of digital content and/or elements in the digital content in accordance with embodiments of the present disclosure.

Figure 6:
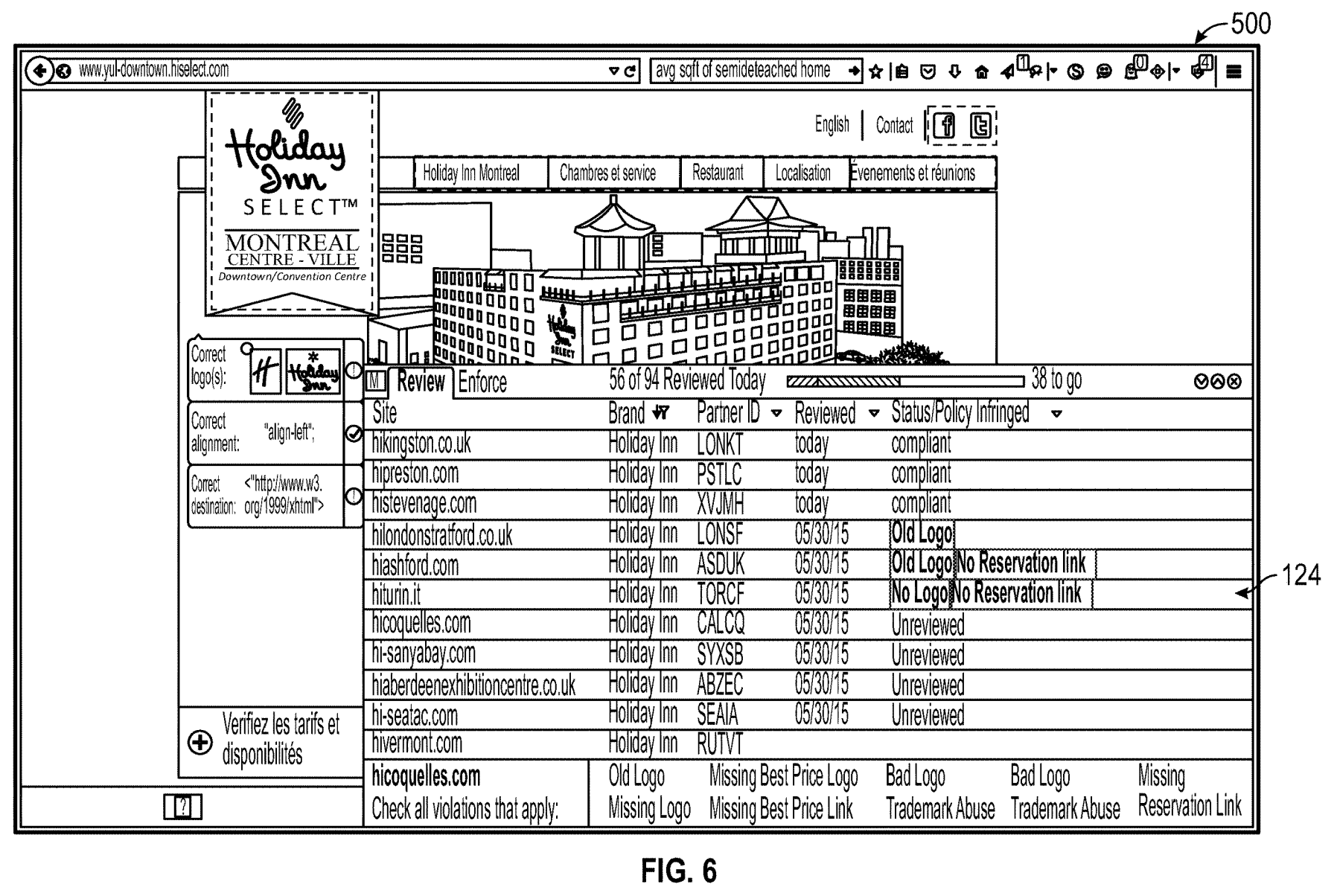

The graphical user interface 124 of the enhanced browser environment can be disposed to overlay a portion of a webpage being displayed by the enhanced browser environment or can be embedded in a frame of the browser window 500. For example, in the present example, the graphical user interface 124 of the enhanced browser environment is shown along a bottom of the browser window 500. As another example, the graphical user interface 124 can be rendered as a pop-up window as shown in FIG. 6. The graphical user interface 124 includes a list of URLs 510 to be reviewed which can be provided to the browser extension by the portal. The list can also include tags and attributes associated with the URLs including brand identities 512 for each URL, a date of last review 514 of the URL based on the records stored in the portal, a status/compliance 516 associated with the URL, and a reason 518 why the URL is or is not in compliance.

The user can move the mouse or cursor over or otherwise perform gesture on the webpage 502 to hover over and/or select one or more elements rendered in the webpage 502, such as an image, text, a link, via the markup overlay of the enhanced browser environment. Upon hovering over an element (e.g., an image 520), an event signal associated with the hovering and/or selection event can be received or intercepted by the markup overlay of the enhanced browser environment, and the markup overlay can highlight the element (as shown by reference number 522). In response to the user right clicking on the element or otherwise gesturing to select the element, an event signal associated with the selection event can be received or intercepted, and the markup overlay of the enhanced browser environment can render a menu 530. The menu 530 can include options or actions that can be performed by the enhanced browser environment. For example, the menu 530 can include an option to identify the selected image 520 as corresponding to an old logo, a bad logo, missing certain types of logos, unauthorized use of the image, and the like. The options can be selected by the user to tag or mark the image or text. For example, in response to selecting one of the options (e.g., the old logo option 532), the enhanced browser environment can include the selected element (e.g., the image 520) as a positive or negative indicator for the specific category, which can be sent to or processed by the portal. The enhanced browser environment can send and/or the portal can process the markup context, relative image size or text position to help distinguish "primary" images from secondary logos or images on the webpage, such as advertisements or other elements the webpage owner does not control. The menu 530 can also include "new policy rule" action for creating an entirely new policy based on an element discovered and highlighted in the webpage by the user. The new policy can be sent to and/or processed by the portal, and in response to receiving the new policy, the portal can refine a harvesting algorithm to include the new policy, such that the next time the harvesting engine of the portal is executed the harvesting engine uses the new policy to identify content in networked environments to be reviewed for possible issues. In some embodiments, the portal can use the data provided from the browser extension to generate or update a policy violation score that can be utilized by the system to identify results to be displayed to a user of the portal.

Figure 7:
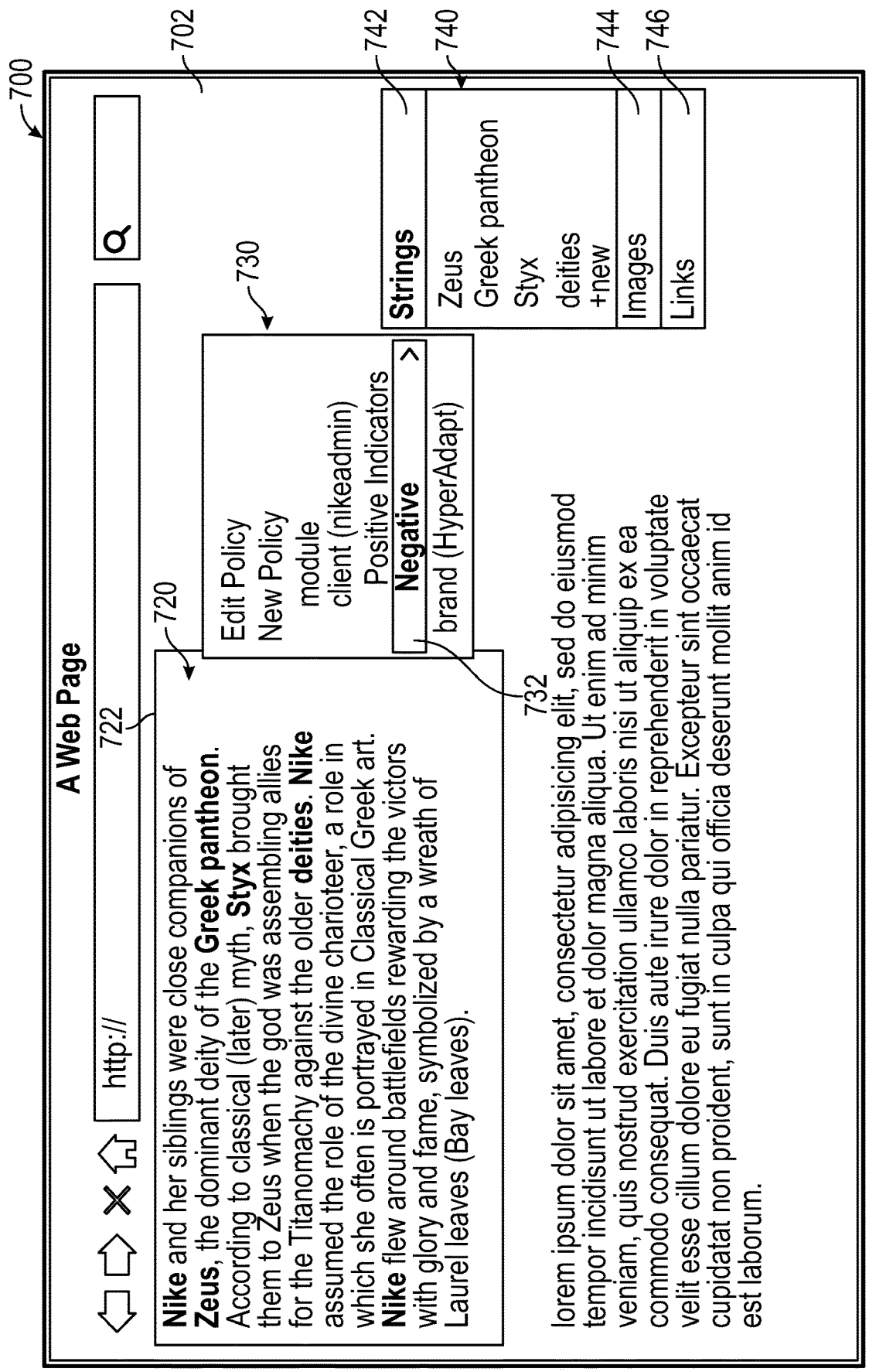

FIG. 7 depicts a webpage 702 opened in a browser window 700 of the enhanced browser environment (e.g., an embodiment of the enhanced browser 145 or an embodiments of the web browser 110 with an embodiment of the browser extension 120 loaded). The enhanced browser environment can be implemented to facilitate contemporaneous in-browser searching, viewing, tagging, comparison, and harvesting of digital content and/or elements in the digital content in accordance with embodiments of the present disclosure.

The user can move the mouse or cursor over or otherwise perform gesture on the webpage 702 to hover over and/or select one or more elements rendered in the webpage 702, such as an image, text, a link, via the markup overlay of the enhanced browser environment. Upon hovering over an element (e.g., an image 720), an event signal associated with the hovering event can be received or intercepted by the markup overlay of the enhanced browser environment, and the markup overlay can highlight the element (as shown by reference number 722). In response to the user right clicking on the element or otherwise gesturing to select the element, the markup overlay can render a menu 730. The menu 730 can include options or actions that can be performed by the enhanced browser environment. For example, the menu 730 can include an option to identify the selected element as corresponding to an edit policy option, a new policy option with sub-options, and the like. The options can be selected by the user to tag or mark the image or text. For example, in response to selecting one of the options (e.g., new policy sub-option "negative" 732), the enhanced browser environment can include the selected element (e.g., the image 720) as a positive or negative indicator for the specific category, which can be sent to and/or processed by the portal by the browser extension. The enhanced browser environment sends and/or the portal processes the markup context, relative image size or text position to help distinguish "primary" images from secondary logos or images on the webpage, such as advertisements or other elements the webpage owner does not control.

In response to selecting an option in the menu 730, a sub-menu 740 can also be displayed to identify contextual attributes on the webpage 502 that support a tag or mark-up of the selected element. For example, the user can identify and add text strings 742, images 744, and link 746 in support of the tag or mark-up of the element. To add a string to the contextual attributes, the user can select "add string" and can highlight strings in the webpage 702 to add as contextual attributes associated with the selected element from the webpage. To add an image to the contextual attributes, the user can select an "add image" option and can highlight images in the webpage 702 to add as contextual attributes associated with the selected element from the webpage. To add links to the contextual attributes, the user can select a link in the webpage, and the URL of the link can appear in the contextual attributes. Because the markup overlay overlays the browser window and the user is has activated the menus, selection of the link by the user does not result in its normal action—i.e. navigation to the URL of the link by the enhanced browser environment. Each of the contextual attributes can be assigned a positive/negative indicator.

A new policy rule can be created by the portal based on the selected element discovered and highlighted in the webpage by the user. The new policy can include the context attributes identified and added by the user via the sub-menu 740. The new policy can be sent to the portal, and in response to receiving the new policy, the portal can refine a harvesting algorithm to include the new policy with the contextual attributes, such that the next time the harvesting engine of the portal is executed, the harvesting engine uses the new policy to identify content in networked environments to be reviewed for possible issues. In some embodiments, the portal can use the data provided from the enhanced browser environment to generate or update a policy violation score that can be utilized by the system to identify results to be displayed to a user of the portal.

As a non-limiting illustrative example, the webpage 702 can be include elements associated with a brand—NIKE. The portal can properly match the string 'NIKE' when identifying the webpage 702 as one to be reviewed using the enhanced browser environment. However, this simple string matching lacks the capability to discern between when the match is within the context of a corporation or a goddess. If the webpage 702 is referencing Nike the goddess rather than NIKE the corporation, the webpage may not be relevant to the user. The user can add context to the portal that the portal may not know or learned—NIKE the corporation is virtually never mentioned alongside mentions of Olympus or Styx (be it the god, river, or band) and that the existence of those strings in the webpage 702 means almost assuredly that the webpage 702 was a false positive and should not have been provided for review. The user can capture this context to train the portal or refine the policy with which the portal identifies webpages for review. The user can add/highlight/type/input additional strings as contextual attributes (e.g., "Zues", "Greek Pantheon", "Styx", "deities"). These contextual attributes can be sent from the enhanced browser environment to the portal and/or can be processed by the portal. Subsequently, when the harvesting engine of the portal returns a result for Nike, the extraction engine of the portal can perform basic string matching against an array negative indicators (e.g., "Zues", "Greek Pantheon", "Styx", "deities") to refine results using the same context the user applied when reviewing the webpage 702. While string matching is described as an illustrative non-limiting example, string matching is one of many policies that can implemented and refined based on contextual attributes identified via the enhanced browser environment.

While the non-limiting illustrative example relates to an entity/account level, the contextual attributes can be utilized at the product level and the general/module level. Such contextual data can be used to refine future results for any product campaigns specific to a product, for all future scans for an entity/account, and/or for other entities/accounts within a given module/channel (e.g., online marketplaces). The refinement at these three levels can improve over time as additional context/policies are based on input received via the enhanced browser environment.

Figure 8:
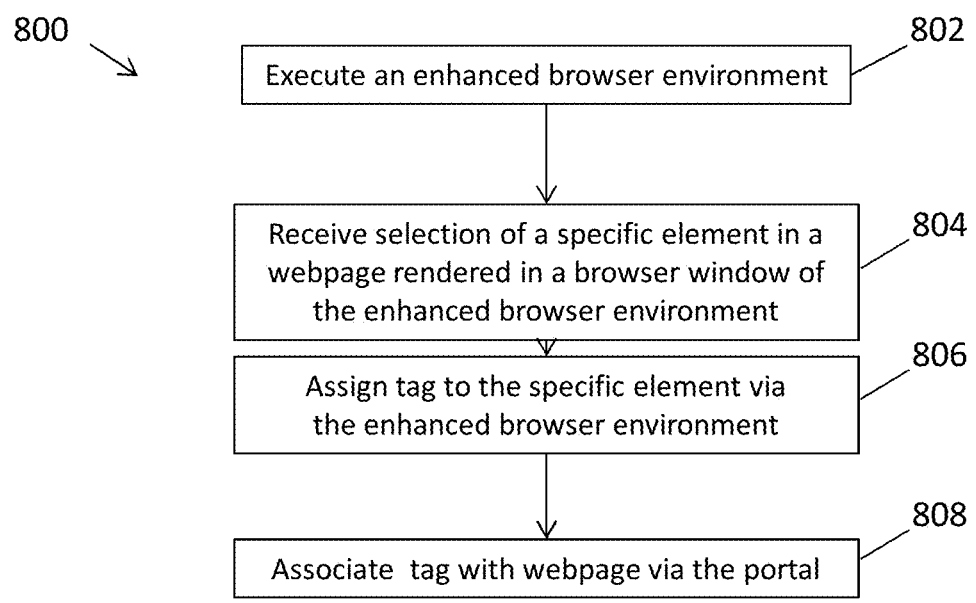
FIG. 8 is a flowchart illustrating an exemplary process for direct, contemporaneous, in-browser searching, viewing, markup, tagging, comparison, and harvesting elements in content in a networked environment in accordance with embodiments of the present disclosure.

FIG. 8 is a flowchart illustrating a process 800 implemented in an embodiment of the environment according to the present disclosure. At operation 802, an enhanced browser environment is executed on a computing resource. For example, an embodiment of the browser extension is executed on a computing resource to extend the functionality of a web browser on the computing resource or an embodiment of the enhanced browser 145 is executed on a computing resource. The enhanced browser environment can facilitate independent and separate selection and tagging of elements in a webpage rendered in a browser window of the enhanced browser environment. The enhanced browser environment is in communication with the portal via a communications network or is embedded in the portal, and the enhanced browser environment can generate a graphical user interface, which can render a list of webpages from the portal. Selection of a URL in the list via the graphical user interface can cause the enhanced browser portal to instruct the enhanced browser environment to retrieve the webpage associated with the URL from a data source hosting the URL in response to selection of the URL from the list. In the event that a record in the database of the portal corresponds to a URL in the list, the enhanced browser environment can populate the graphical user interface of the enhanced browser environment with data retrieved from the record.

At operation 804, selection of a specific element in the webpage is received via the enhanced browser environment. For example, the enhanced browser environment can receive or intercept an event signal associated with the selection of a specific element. The enhanced browser environment (e.g., the enhanced browser or the browser extension) can generate a menu in response to selection of the specific element (e.g., in response to the event signal). The menu can include at least one option or action capable of being performed by the enhanced browser environment based on selection of the specific element. At operation 806, a tag is assigned to the specific element via the enhanced browser environment (e.g., via a menu generated by the enhanced browser environment). The tag can indicate whether the specific element is benign or malignant in the context of the webpage. At operation 808, the tag is sent from the enhanced to the portal and/or can be processed by the portal to associate the tag with the specific element and a Universal Resource Locator (URL) of the webpage.

The enhanced browser environment can also send the specific element to the portal and/or can extract a segment of the source code of the webpage in response to selection of the specific element and can send the extracted segment of the source code to the portal. In the event that the portal does not have a database record corresponding to the URL associated with the webpage, the portal can create a record for the URL in the database in response to receiving the tag, specific element, segment of source code, and/or contextual attributes from the enhanced browser extension and can add the tag, specific element, segment of source code, and/or the contextual attributes to the record.

The menu can include options or actions for associating contextual attributes with the specific element such that selection of one or more strings, images, and/or links in the webpage can be received via the enhanced browser extension in support or opposition of the tag assigned to the specific element. The one or more strings, images, and/or links can be selected in the webpage via the enhanced browser environment in response to highlighting, clicking on, hovering over, a user gesture. Selection of one or more links in the webpage via the enhanced browser environment can add destinations of the link to the contextual attributes without causing the web browser to navigate to the webpages referenced by the one or more links.

Figure 9:
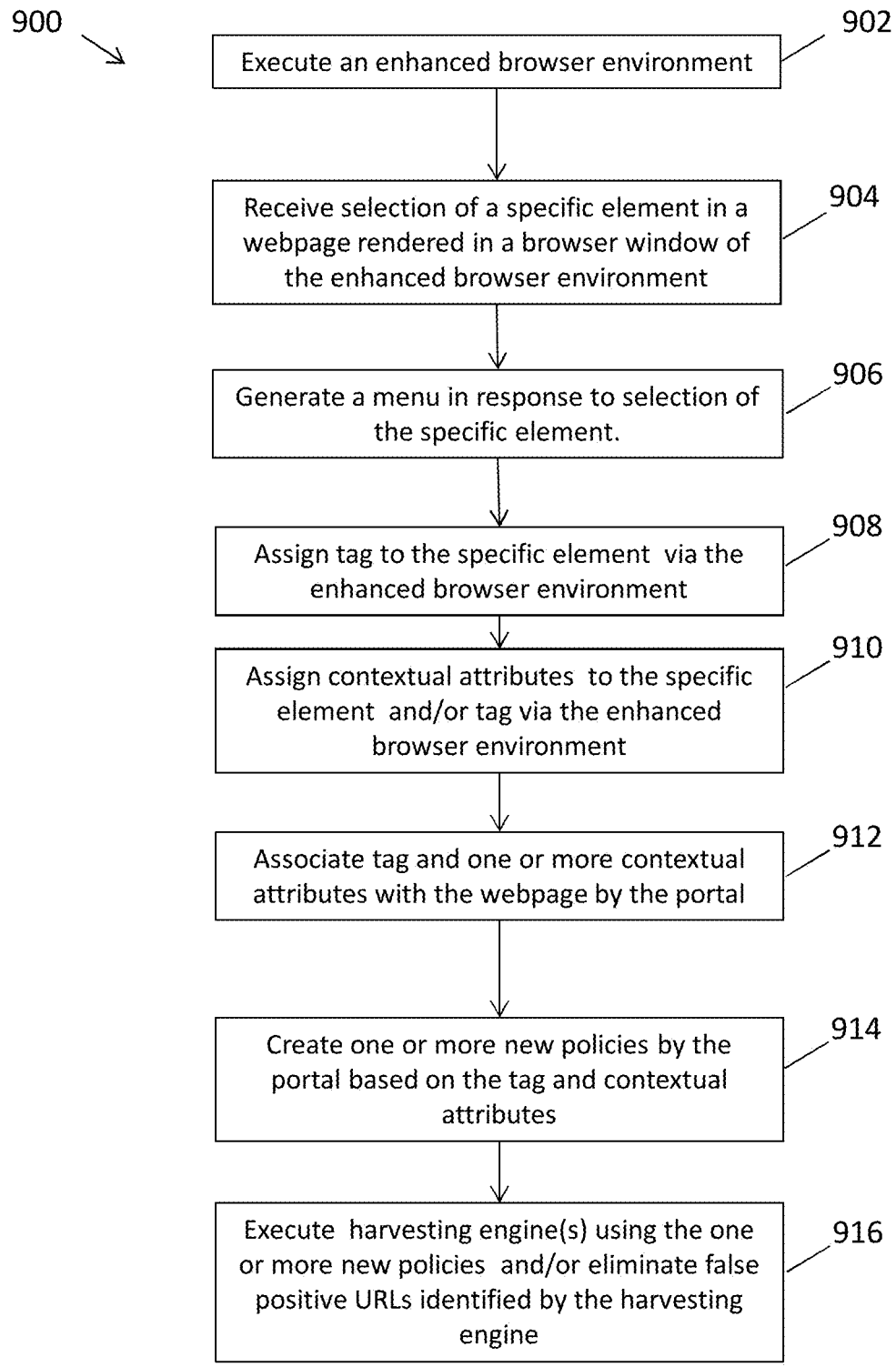
FIG. 9 is a flowchart illustrating an exemplary process for direct, contemporaneous, in-browser tagging specific elements in a webpage and assigning contextual attributes to the tag and/or specific element in accordance with embodiments of the present disclosure.

FIG. 9 is a flowchart illustrating a process 900 implemented in an embodiment of the environment according to the present disclosure. At operation 902, an enhanced browser environment is executed on a computing resource. For example, an embodiment of the browser extension is executed on a computing resource to extend the functionality of a web browser on the computing resource or an embodiment of the enhanced browser 145 is executed on a computing resource. The enhanced browser environment can facilitate independent and separate selection and tagging of elements in a webpage rendered in a browser window of the web browser. The enhanced browser environment is in communication with the portal via a communications network or is embedded in portal, and the enhanced browser environment can generate a graphical user interface, which can render a list of webpages from the portal. Selection of a URL in the list via the graphical user interface can cause the enhanced browser environment to instruct the web browser to retrieve the webpage associated with the URL from a data source hosting the URL in response to selection of the URL from the list. In the event that a record in the database of the portal corresponds to a URL in the list, the enhanced browser environment can populate the graphical user interface of the enhanced browser environment with data retrieved from the record.

At operation 904, selection of a specific element in the webpage is received via the enhanced browser environment. For example, the enhanced browser environment can receive or intercept an event signal associated with the selection of a specific element. At operation 906, the enhanced browser environment generates a menu in response to selection of the specific element (e.g., in response to the event signal). The menu can include at least one option or action capable of being performed by the enhanced browser environment based on selection of the specific element. At operation 908, a tag is assigned to the specific element via the menu of the enhanced browser environment. The tag can indicate whether the specific element is benign or malignant in the context of the webpage. At operation 910, one or more contextual attributes in the webpage are selected and assigned to the tag and/or specific element via the enhanced browser environment. At operation 912, the tag and one or more contextual attributes are sent from the enhanced browser environment to the portal and/or the portal processes the tag and one or more contextual attributes to associate the tag and contextual attributes with the specific element and a Universal Resource Locator (URL) of the webpage.

At operation 914, the portal can create one or more new policies based on the tag and contextual attributes received from the enhanced browser environment, and at operation 916, the portal can execute one or more harvesting engines using the one or more new policies to identify additional URLs to be reviewed in the enhanced browser environment and/or can be used by the portal to eliminate false positive URLs identified by the harvesting engine.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method for contemporaneous in-browser tagging and harvesting of digital content in a networked environment, the method comprising:
   executing an enhanced browser environment on a computing resource to facilitate independent and separate selection and tagging of elements in a webpage rendered in a browser window of the enhanced browser environment, the enhanced browser environment interfacing with a portal;
   defining, via the portal, a policy for expected elements in the webpage;
   receiving selection of a specific element in the webpage via the enhanced browser environment;
   assigning a tag to the specific element based on the policy;
   associating the tag with the element and a Universal Resource Locator (URL) of the webpage by the portal;
   performing in-browser harvesting of the tagged element in the webpage in response to the association;
   defining a new policy based on the tag assigned to the specific element; and
   refining a harvesting algorithm of a harvesting engine to include the new policy, the harvesting engine using the harvesting algorithm refined by the new policy to discover content in the networked environment for harvesting.

2. The method of claim 1, further comprising:
   generating a graphical user interface via the enhanced browser environment;
   receiving a list of webpages from the portal;
   receiving selection of the URL in the list via the graphical user interface; and
   instructing the enhanced browser environment to retrieve the webpage associated with the URL from a data source hosting the URL in response to selection of the URL from the list.

3. The method of claim 2, wherein the tag indicates whether the specific element in the webpage is benign or malignant.

4. The method of claim 1, further comprising:
   generating a menu by the enhanced browser environment in response to selection of the specific element, the menu including at least one option or action capable of being performed by the enhanced browser environment based on selection of the specific element.

5. The method of claim 4, wherein the enhanced browser environment assigns the tag to the specific element in response to selection of the at least one option or action.

6. The method of claim 4, wherein the at least one option or action includes associating contextual attributes with the specific element, and the method further comprising:
   receiving selection of one or more strings in the webpage via the enhanced browser environment in support or opposition of the tag assigned to the specific element.

7. The method of claim 6, wherein selection of the one or more strings comprises:
   highlighting the one or more strings in the webpage via the enhanced browser environment.

8. The method of claim 4, wherein the at least one option or action includes associating contextual attributes with the specific element, and the method further comprising:
receiving selection of one or more images in the webpage via the enhanced browser environment in support or opposition of the tag assigned to the specific element.

9. The method of claim 4, wherein the at least one option or action includes associating contextual attributes with the specific element, and the method further comprising:
receiving selection of one or more links in the webpage via the enhanced browser environment in support or opposition of the tag assigned to the specific element.

10. The method of claim 9, wherein selection, via the enhanced browser environment, of one or more links in the webpage adds destinations of the link to the contextual attributes.

11. The method of claim 10, wherein selection of the one or more links does not result in the enhanced browser environment navigating to a webpage referenced by the one or more links.

12. The method of claim 1, further compromising:
extracting a segment of the source code of the webpage in response to selection of the element; and
transmitting the extracted segment of the source code from the enhanced browser environment to the portal.

13. The method of claim 1, wherein the URL does not have a corresponding record in a database maintained by the portal and the method further comprises:
creating a record for the URL in response to receiving the tag from the enhanced browser environment;
adding the tag to the record.

14. The method of claim 1, wherein the URL has a corresponding record in the database and the method further comprises:
populating a graphical user interface of the enhanced browser environment with data retrieved from the record.

15. The method of claim 1, further comprising:
generating queries using the harvesting algorithm refined by the new policy to search for digital content to harvest.

16. The method of claim 15, wherein generating the queries comprises:
generating the queries from a single set of terms using the harvesting algorithm, each query being specific to at least one of a search engine or application program interface (API).

17. The method of claim 15, wherein execution of the queries returns a list of Universal Resource Locators (URLs) associated with additional webpages to be reviewed.

18. A system for contemporaneous in-browser tagging and harvesting of digital content in a networked environment, the system comprising:
a remote computing system including one or more servers programmed to execute a portal accessible via a network;
at least one computing device, having installed thereon, a web browser and a browser extension, the browser extension being programmed to extend the functionality of the web browser and to facilitate independent and separate selection and tagging of elements in a webpage rendered in a browser window of the web browser, the browser extension being in communication with the portal via the network,
wherein the at least one computing device is programmed to execute the browser extension to:
identify a policy for expected elements in the webpage;
receive selection of a specific element in the webpage via the browser extension;
assign a tag to the specific element based on the policy;
send the tag from the browser extension to the portal to associate the tag with the element and a Universal Resource Locator (URL) of the webpage;
perform in-browser harvesting of the tagged element in the webpage in response to the association; and
define a new policy based on the tag assigned to the specific element, the portal refining a harvesting algorithm of a harvesting engine to include the new policy, the harvesting engine using the harvesting algorithm refined by the new policy to discover content in the networked environment for harvesting.

19. The system of claim 18, wherein the at least one computing device is programmed to execute the browser extension to:
generate a graphical user interface via the browser extension;
receive a list of webpages from the portal;
receive selection of the URL in the list via the graphical user interface; and
instruct the web browser to retrieve the webpage associated with the URL from a data source hosting the URL in response to selection of the URL from the list.

20. The system of claim 18, wherein the at least one computing device is programmed to execute the browser extension to:
generate a menu by the browser extension in response to selection of the specific element, the menu including at least one option or action capable of being performed by the browser extension based on selection of the specific element,
wherein the browser extension assigns the tag to the specific element or associates at least one contextual attribute with the specific element in response to selection of the at least one option or action.

21. The system of claim 20, wherein the at least one computing device is programmed to execute the browser extension to:
receive selection of one or more strings, images or links in the webpage via the browser extension in support or opposition of the tag assigned to the specific element.

22. The system of claim 21, wherein the browser extension adds the one or more strings as contextual attributes in response to selection of the one or more strings, images, or links via the browser extension.

23. The system of claim 18, wherein the at least one computing device is programmed to execute the browser extension to:
extract a segment of the source code of the webpage in response to selection of the element; and
transmit the extracted segment of the source code from the browser extension to the portal.

24. The system of claim 18, wherein the tag indicates whether the specific element in the webpage is benign or malignant.

* * * * *